United States Patent
Kanno et al.

(10) Patent No.: US 11,886,727 B2
(45) Date of Patent: Jan. 30, 2024

(54) MEMORY SYSTEM AND METHOD FOR CONTROLLING NONVOLATILE MEMORY

(71) Applicant: Kioxia Corporation, Tokyo (JP)

(72) Inventors: Shinichi Kanno, Ota (JP); Naoki Esaka, Kawasaki (JP)

(73) Assignee: Kioxia Corporation, Tokyo (JP)

(*) Notice: Subject to any disclaimer, the term of this patent is extended or adjusted under 35 U.S.C. 154(b) by 152 days.

(21) Appl. No.: 17/653,385

(22) Filed: Mar. 3, 2022

(65) Prior Publication Data
US 2022/0404966 A1   Dec. 22, 2022

(30) Foreign Application Priority Data
Jun. 21, 2021   (JP) ................... 2021-102382

(51) Int. Cl.
G06F 3/06        (2006.01)
(52) U.S. Cl.
CPC ............ *G06F 3/064* (2013.01); *G06F 3/0619* (2013.01); *G06F 3/0631* (2013.01); *G06F 3/0659* (2013.01); *G06F 3/0679* (2013.01)
(58) Field of Classification Search
CPC ...... G06F 3/064; G06F 3/0619; G06F 3/0631; G06F 3/0659; G06F 3/0679; G06F 2212/1016; G06F 2212/1032; G06F 2212/7204; G06F 2212/7208; G06F 2212/7201; G06F 12/0246; G06F 13/1668
See application file for complete search history.

(56) References Cited

U.S. PATENT DOCUMENTS

| | | | |
|---|---|---|---|
| 10,324,834 B2 | 6/2019 | Seo et al. | |
| 10,761,733 B2 | 9/2020 | Kanno | |
| 2008/0082736 A1 | 4/2008 | Chow et al. | |
| 2010/0228928 A1* | 9/2010 | Asnaashari | G06F 12/0246 711/170 |
| 2010/0228940 A1* | 9/2010 | Asnaashari | G06F 12/0246 711/170 |
| 2012/0185740 A1 | 4/2012 | Hsu et al. | |
| 2020/0409559 A1 | 12/2020 | Sharon et al. | |
| 2021/0064288 A1* | 3/2021 | Kanno | G06F 3/0659 |
| 2021/0096967 A1* | 4/2021 | Choi | H10B 43/50 |
| 2022/0350530 A1* | 11/2022 | Yoshida | G06F 3/0644 |
| 2022/0405008 A1* | 12/2022 | Masuo | G06F 3/064 |

FOREIGN PATENT DOCUMENTS

JP   6524039 B2   6/2019
JP   2021-6984 A   1/2021

\* cited by examiner

*Primary Examiner* — Hiep T Nguyen
(74) *Attorney, Agent, or Firm* — Oblon, McClelland, Maier & Neustadt, L.L.P.

(57) ABSTRACT

According to one embodiment, a controller constructs a plurality of block groups. The plurality of block groups include at least a first block group configured using a first type block group and a second block group configured using a second block group. The first type block group includes a plurality of non-defective blocks obtained by selecting one or more non-defective blocks in an equal number from each of a plurality of dies or each of a plurality of planes. The second type block group includes a plurality of non-defective blocks. The number of non-defective blocks included in the second type block group is equal to the number of non-defective blocks included in the first type block.

14 Claims, 17 Drawing Sheets

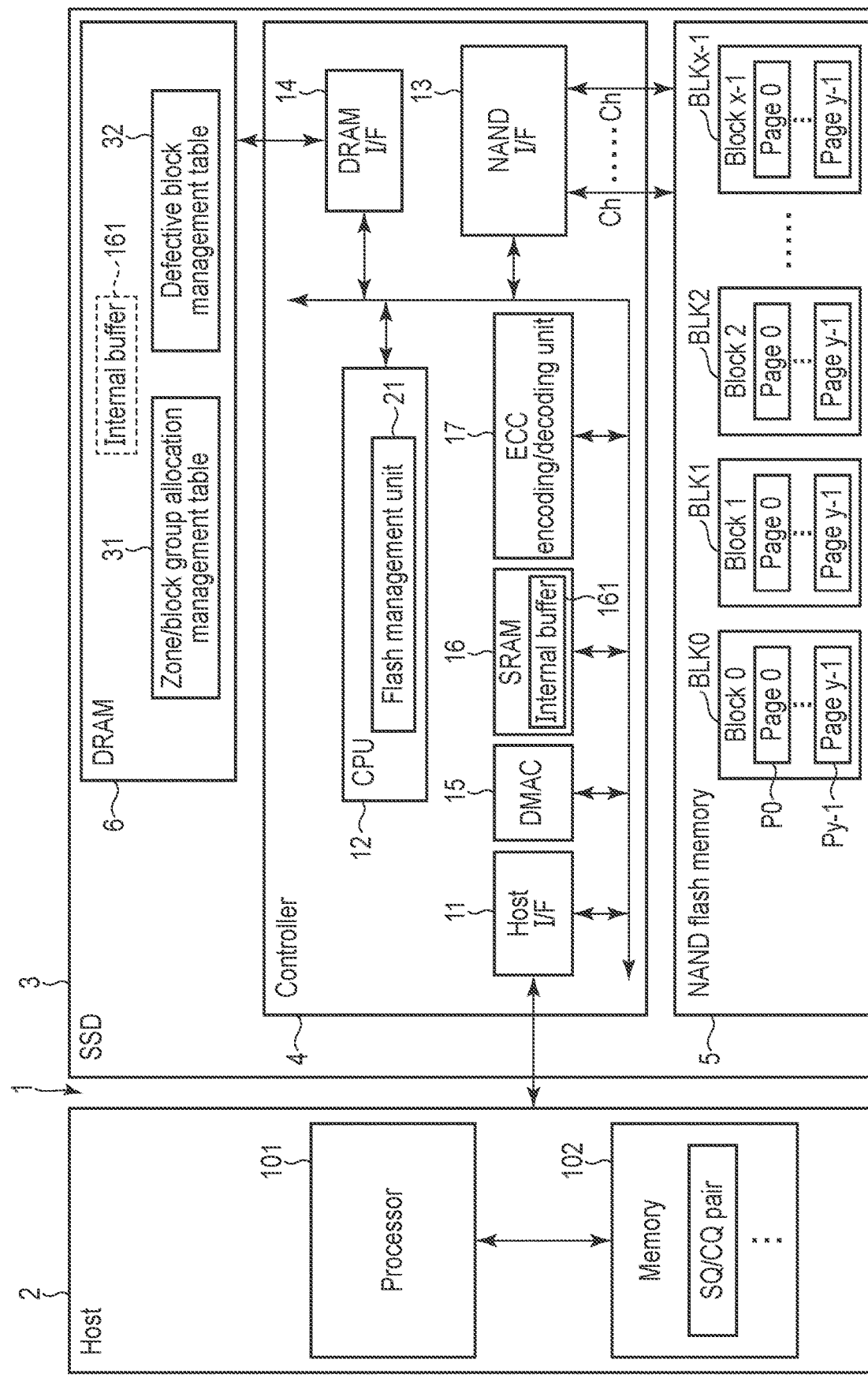
F I G. 1

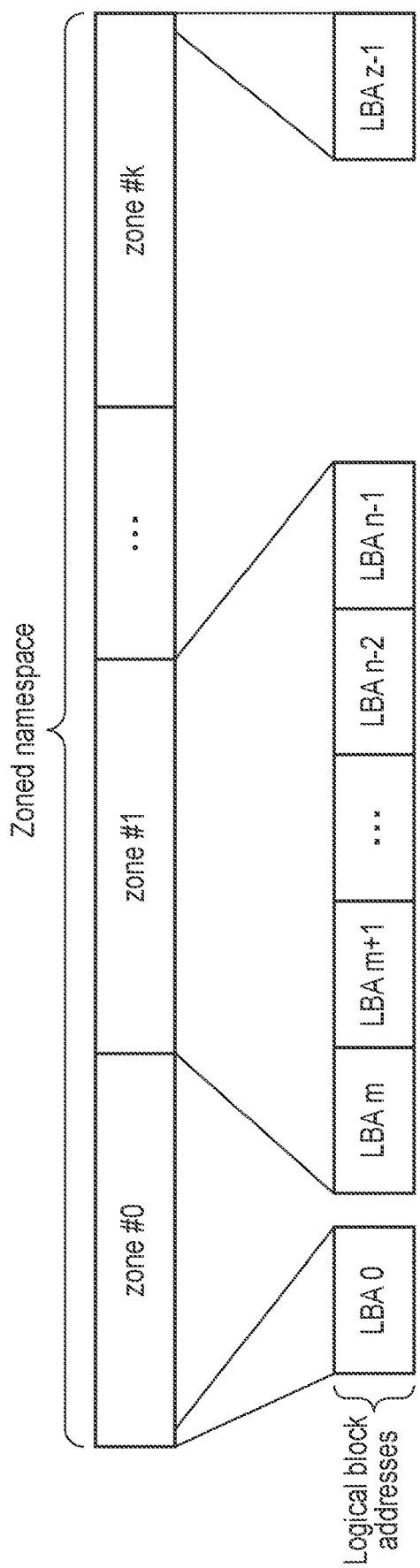
F I G. 4

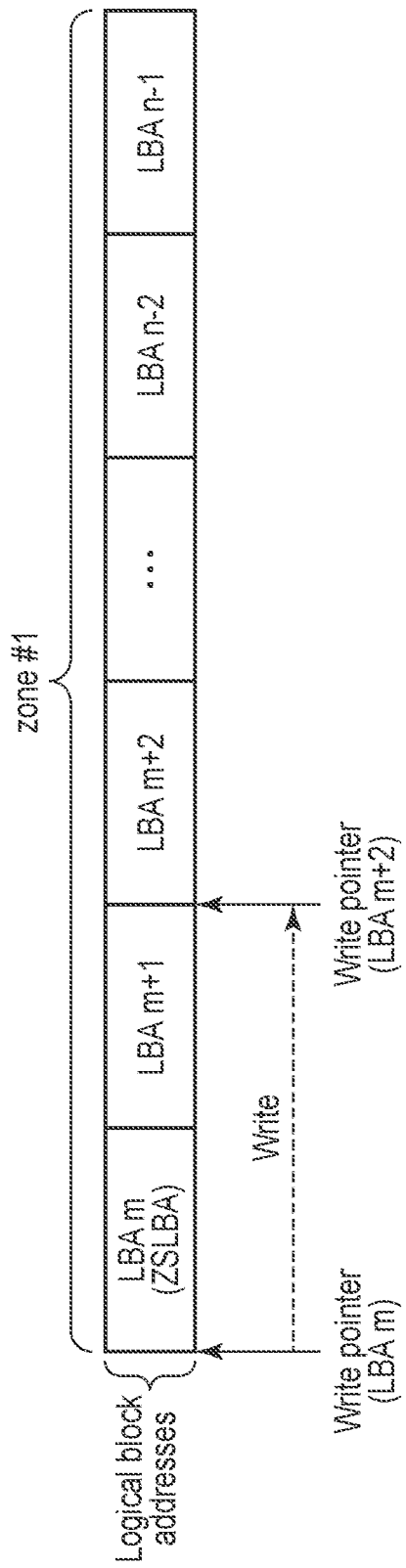
F I G. 5

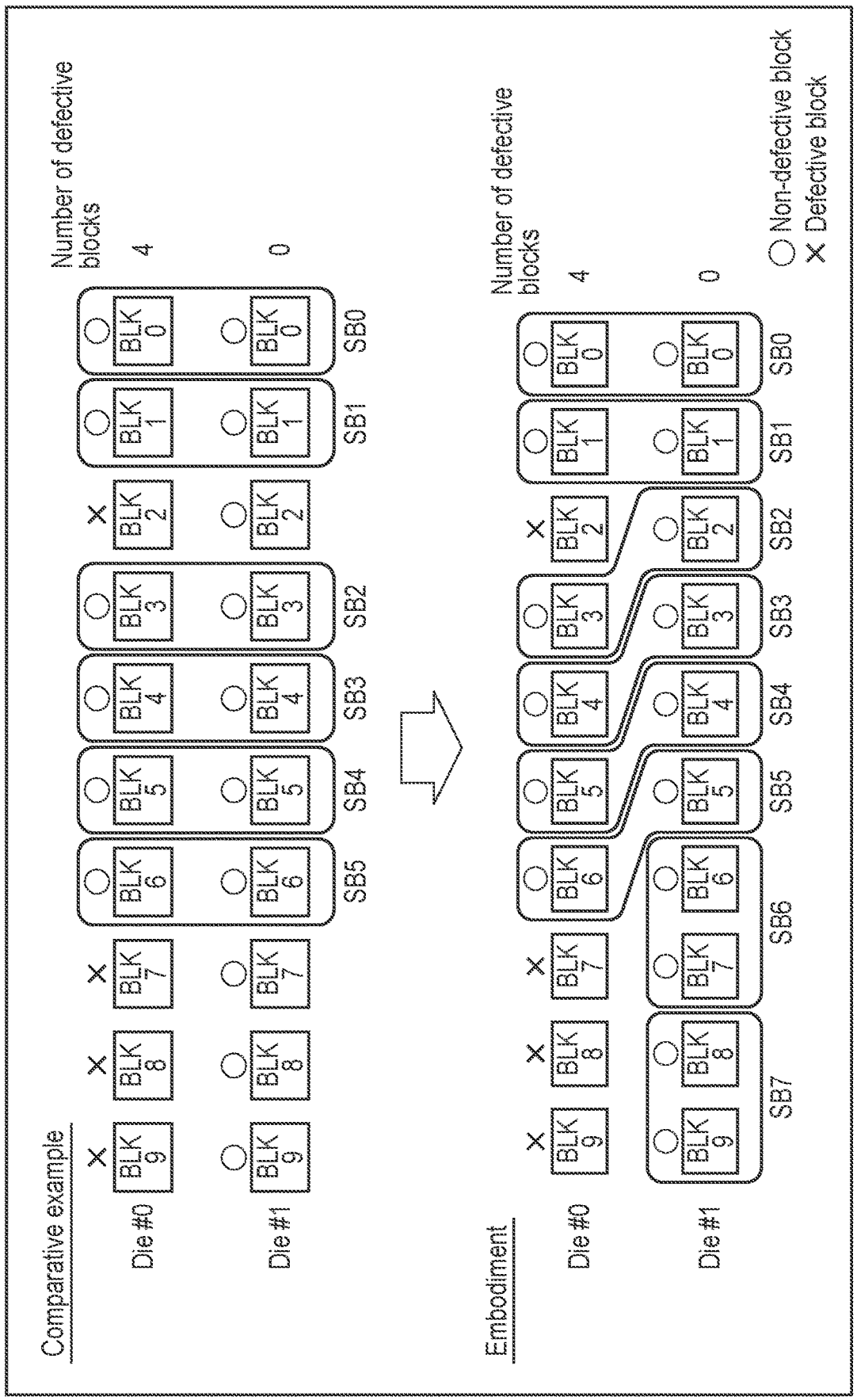
F I G. 6

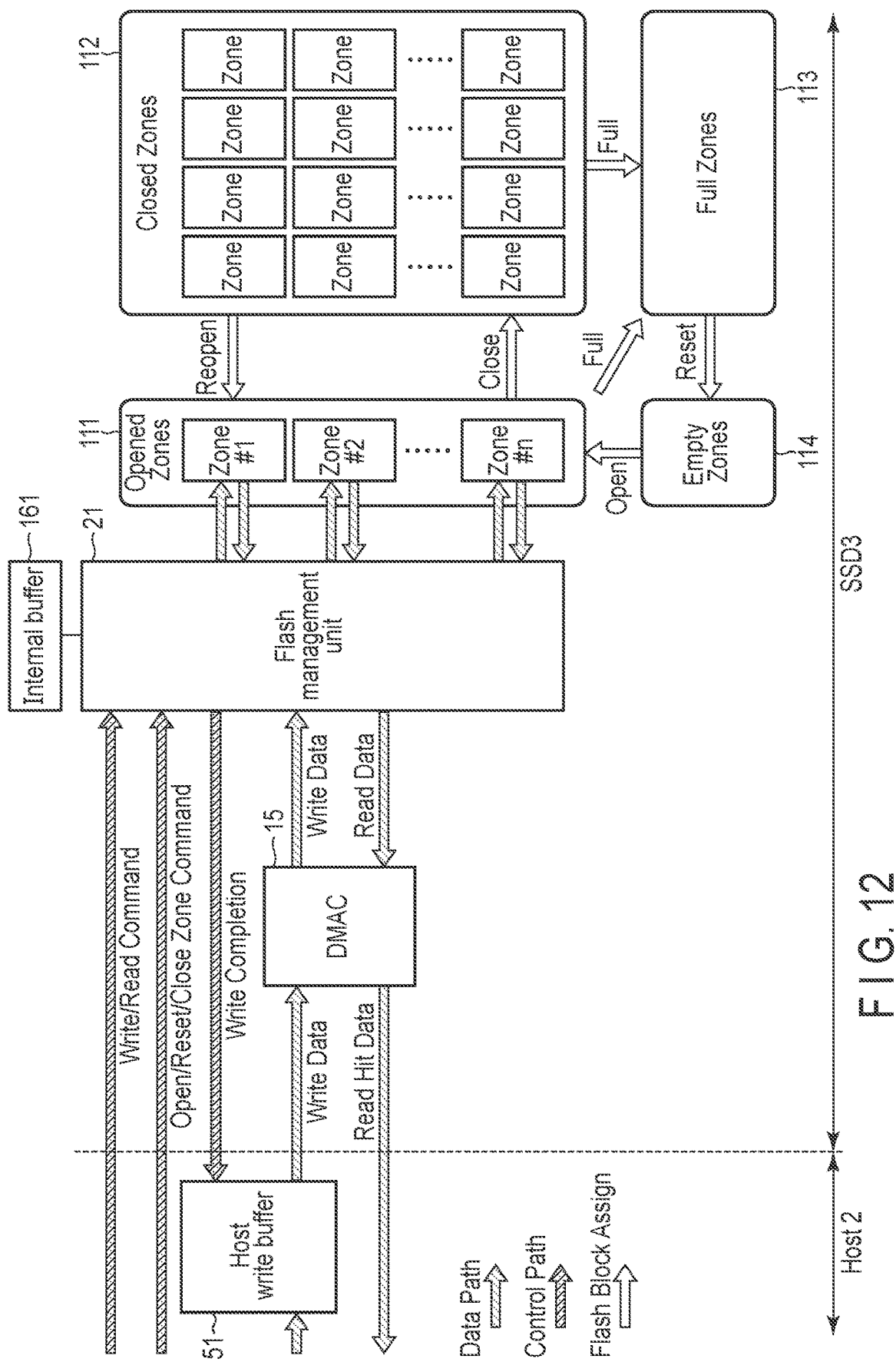
F I G. 12

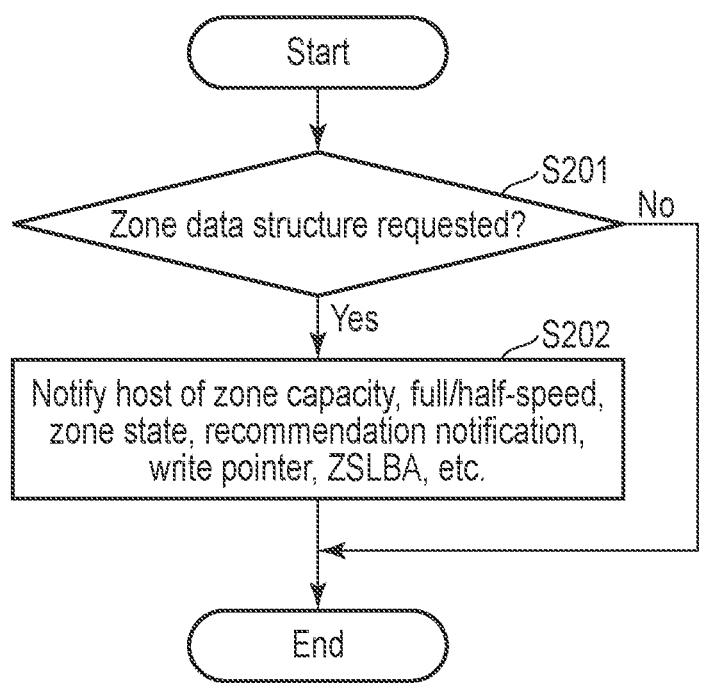
F I G. 15

MEMORY SYSTEM AND METHOD FOR CONTROLLING NONVOLATILE MEMORY

CROSS-REFERENCE TO RELATED APPLICATIONS

This application is based upon and claims the benefit of priority from Japanese Patent Application No. 2021-102382, filed Jun. 21, 2021, the entire contents of which are incorporated herein by reference.

FIELD

Embodiments described herein relate generally to a technique for controlling a nonvolatile memory.

BACKGROUND

In recent years, a memory system implemented with a nonvolatile memory has been widely used. As one of such memory systems, a solid state drive (SSD) implemented with a NAND flash memory has been known.

In a memory system such as an SSD, a plurality of blocks (a plurality of physical blocks) respectively selected from different dies may be used as an access unit for writing or reading data. In this case, when the deviation in the number of defective blocks between the dies mounted in the memory system is large, the number of blocks that are not actually used may increase although the blocks are non-defective blocks that are not defective.

Therefore, in the memory system, it is required to realize a new technology for efficiently using each block included in the nonvolatile memory.

BRIEF DESCRIPTION OF THE DRAWINGS

FIG. 1 is an illustrating block diagram illustrating an example of a configuration of an information processing system including a memory system and a host according to the embodiment.

FIG. 4 is a diagram illustrating a configuration example of a zoned namespace defined by a standard of NVMe.

FIG. 5 is a diagram illustrating an update operation of a write pointer executed in the memory system according to the embodiment.

FIG. 6 is a diagram illustrating a first example of a configuration of a plurality of block groups managed in the memory system according to the embodiment.

FIG. 12 is a block diagram illustrating an example of a sequence of a write operation and a sequence of a read operation performed in the memory system according to the embodiment.

FIG. 15 is a flowchart illustrating a procedure of an access speed notification operation executed in the memory system according to the embodiment.

DETAILED DESCRIPTION

Figure 2:
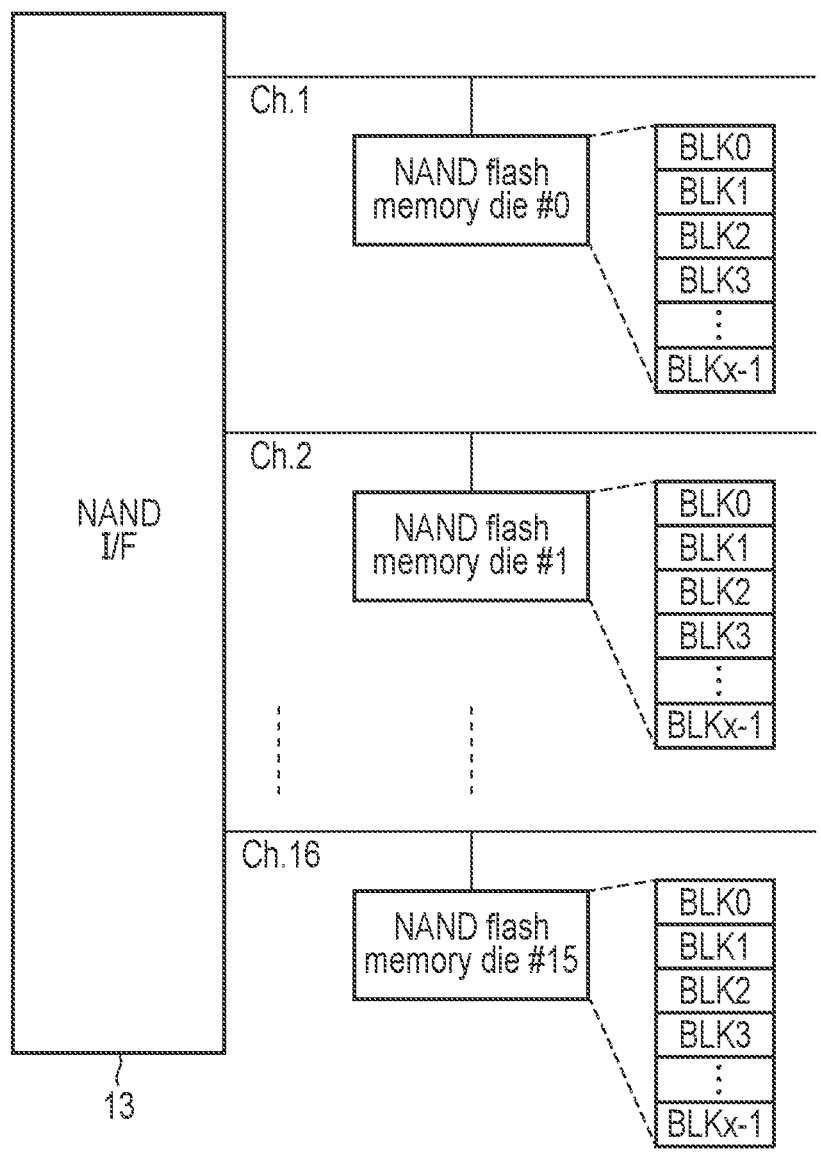
FIG. 2 is a block diagram illustrating an example of a relationship between a plurality of channels and a plurality of NAND flash memory dies used in the memory system according to the embodiment.

Various embodiments will be described hereinafter with reference to the accompanying drawings.

In general, according to one embodiment, a memory system connectable to host includes a nonvolatile memory including a plurality of dies capable of being operated in parallel or a plurality of planes capable of being operated in parallel, and a controller electrically connected to the nonvolatile memory and configured to control the nonvolatile memory. Each of the plurality of dies or the plurality of planes includes a plurality of blocks. Each of the plurality of blocks is a unit for a data erase operation. The controller constructs, from the plurality of dies or the plurality of planes, a plurality of block groups each including a plurality of blocks. In response to receiving a write command for writing data to one block group of the plurality of block groups from the host, the controller write data associated with the received write command to the one block group. The plurality of block groups include at least a first block group configured using a first type block group and a second block group configured using a second type block group. The first type block group includes a plurality of non-defective blocks obtained by selecting one or more non-defective blocks in an equal number from each of the plurality of dies or each of the plurality of planes. The second type block group includes a plurality of non-defective blocks selected from part of the plurality of dies or part of the plurality of planes. The number of the non-defective blocks included in the second type block group is equal to the number of the non-defective blocks included in the first type block group. The number of non-defective blocks per die or per plane included in the second type block group is different between a first die and a second die of the part of the plurality of dies or between a first plane and a second plane of the part of the plurality of planes.

First, an example of a configuration of an information processing system including a memory system according to an embodiment will be described. FIG. 1 is a block diagram illustrating an example of a configuration of an information processing system 1 including a memory system and a host according to an embodiment. Hereinafter, it is assumed that the memory system is realized as a solid state drive (SSD) 3 including a NAND flash memory.

The information processing system 1 includes a host (host device) 2 and the SSD 3. The SSD 3 is a semiconductor storage device configured to write data to a nonvolatile memory and read data from the nonvolatile memory. The SSD 3 is connected to the host 2 through a cable or a network. Alternatively, the SSD 3 may be built in the host 2. As a standard of a logical interface for connecting the host 2 and the SSD 3, for example, NVM Express™ (NVMe™ standard) can be used.

The host 2 includes a processor 101 and a memory 102. The processor 101 is a central processing unit (CPU) configured to control an operation of each component in the host 2.

The processor 101 executes software (host software) loaded from the SSD 3 or another storage device in the host 2 into the memory 102. The host software includes an operating system, a file system, a device driver, an application program, and the like.

The memory 102 is a main memory provided in the host 2. The memory 102 is realized by, for example, a random access memory such as a dynamic random access memory (DRAM).

Part of the storage region of the memory 102 is used to store one or more submission queue/completion queue pairs (SQ/CQ pairs). Each SQ/CQ pair includes one or more submission queues (SQ) and completion queues (CQ) associated with the one or more submission queues (SQ).

The submission queue (SQ) is a queue used to issue a command to the SSD 3. The completion queue (CQ) is a queue used to receive a response indicating command completion from the SSD 3.

The host 2 transmits various commands to the SSD 3 via one or more submission queues (SQ) included in each SQ/CQ pair.

The SSD 3 includes a controller 4 and a nonvolatile memory (for example, a NAND flash memory 5). The SSD 3 may also include a random access memory, for example, a DRAM 6.

The NAND flash memory 5 includes a memory cell array including a plurality of memory cells disposed in a matrix. The NAND flash memory 5 may be a flash memory having a two-dimensional structure or a flash memory having a three-dimensional structure.

The memory cell array includes a plurality of blocks BLK0 to BLKx−1. Each of the blocks BLK0 to BLKx−1 includes a plurality of pages (here, pages P0 to Py−1). Each page includes a plurality of memory cells connected to the same word line. Each of the blocks BLK0 to BLKx−1 is a unit for a data erase operation for erasing data. Each of the blocks BLK0 to BLKx−1 is also referred to as a physical block or a flash block. Each of the pages P0 to Py−1 is a unit for a data write operation and a data read operation.

As illustrated in FIG. 2, the NAND flash memory 5 includes a plurality of dies (also referred to as a NAND flash memory die or a NAND flash memory chip). Each die, that is, each NAND flash memory die is independently operable. Therefore, each of the plurality of NAND flash memory dies is treated as a unit that can operate in parallel.

FIG. 2 illustrates a case where 16 channels Ch. 1 to Ch. 16 are connected to the NAND interface 13, and one NAND flash memory die is connected to each of the 16 channels Ch. 1 to Ch. 16. In this case, data write/read operations on the 16 NAND flash memory dies #0 to #15 connected to the channels Ch. 1 to Ch. 16 can be performed in parallel.

Figure 3:
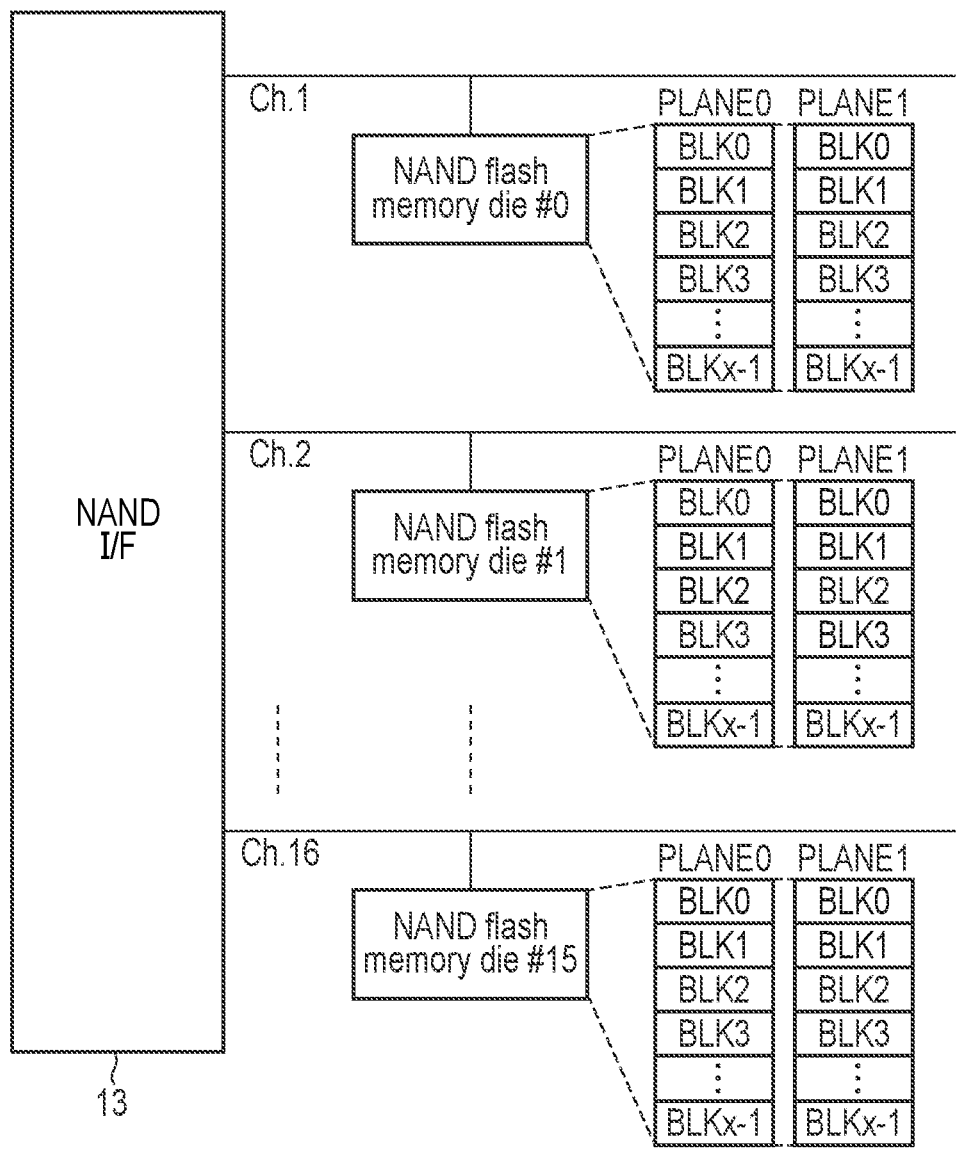
FIG. 3 is a block diagram illustrating another example of a relationship between a plurality of channels and a plurality of NAND flash memory dies used in the memory system according to the embodiment.

Note that each of the NAND flash memories #0 to #15 may have a multi-plane configuration including a plurality of planes that can operate in parallel. Each plane includes a plurality of blocks (physical blocks). For example, each of the NAND flash memory dies #0 to #15 may have a multi-plane configuration including two planes (PLANE 0, PLANE 1) as illustrated in FIG. 3. In each of the NAND flash memory dies #0 to #15 illustrated in FIG. 3, a data write/read operation on the first plane (PLANE 0) and a data write/read operation on the second plane (PLANE 1) can be performed in parallel. In the configuration illustrated in FIG. 3, data write/read operations on the 32 planes included in the NAND flash memory 5 can be performed in parallel.

The controller 4 illustrated in FIG. 1 is realized by a circuit such as a system-on-a-chip (SoC).

The controller 4 is electrically connected to the NAND flash memory 5 (that is, the NAND flash memories #0 to #15) via a NAND interface 13 conforming to a Toggle NAND flash interface or an open NAND flash interface (ONFI). The controller 4 operates as a memory controller configured to control the NAND flash memory 5.

The controller 4 controls the NAND flash memory 5 (that is, the NAND flash memory dies #0 to #15) to perform a data write operation of writing data received from the host 2 to the NAND flash memory 5 and a data read operation of reading data to be read requested by the host 2 from the NAND flash memory 5.

The controller 4 constructs a plurality of block groups each including a plurality of blocks (a plurality of physical blocks) from a plurality of dies that can operate in parallel or a plurality of planes that can operate in parallel included in the NAND flash memory 5. The controller 4 manages the constructed plurality of block groups as a plurality of physical storage regions accessible by the host 2.

A plurality of block groups (that is, a plurality of physical storage regions) is used to enable the host 2 and the controller 4 to manage the data placement on the NAND flash memory 5 in cooperation with each other.

For example, when a write command for writing data to a certain block group is received from the host 2, the controller 4 determines this block group as a write destination block group, and writes data associated with the received write command to this write destination block group. When a write command for writing data to another block group is received from the host 2, the controller 4 determines this another block group as a write destination block group, and writes data associated with the received write command to this write destination block group.

As a write command for writing data to any one block group, a write command including a parameter specifying an identifier of a write destination block group can be used. In this case, the controller 4 determines the block group specified by the received write command as the write destination block group.

Alternatively, as a write command for writing data to any one block group, a write command used in a Zoned Namespaces (ZNS) defined in the standard of NVMe can also be used.

In a case where the controller 4 supports the ZNS, the controller 4 can operate the SSD 3 as a zoned device. In the zoned device, a plurality of zones to which a plurality of logical address ranges obtained by dividing a logical address space for accessing the SSD 3 are allocated are used as logical storage regions.

The logical address space for accessing the SSD 3 is continuous logical address used by the host 2 to access the SSD 3. A logical block address (LBA) is used as the logical address.

A plurality of block groups managed by the controller 4 is used as a plurality of physical storage regions that can be allocated to the plurality of respective zones.

Hereinafter, a case where the controller 4 supports the ZNS and a write command used in the ZNS defined by the NVMe standard, that is, a write command specifying a zone is used as a write command for writing data to any block group will be mainly described.

FIG. 4 is a diagram illustrating an example of configuration of one zoned namespace defined by the standard of NVMe.

The logical block address range of each zoned namespace starts from the LBA 0. For example, the logical block address range of the zoned namespace of FIG. 4 includes z consecutive LBAs from an LBA 0 to an LBA z−1. This zoned namespace is divided into k+1 zones from a zone #0 to a zone #k. These k+1 zones include contiguous non-overlapping logical block addresses.

More specifically, the zone #0, the zone #1, . . . , and the zone #k are allocated to the zoned namespace. The LBA 0 indicates the minimum LBA of the zone #0. The LBA z−1 indicates the maximum LBA of the zone #k. The zone #1 includes the LBA m, the LBA m+1, . . . , the LBA n−2, and the LBA n−1. The LBA m indicates the smallest LBA of the zone #1. The LBA n−1 indicates the maximum LBA of the zone #1.

The controller 4 allocates one of the plurality of block groups to each of the plurality of zones as a physical storage region, thereby managing mapping between each of the plurality of block groups and each of the plurality of zones.

When a write command specifying a certain zone is received from the host 2, the controller 4 determines a block group allocated to the zone specified by the received write command as a write destination block group. Then, the controller 4 writes data associated with the received write command to the block group determined as the write destination block group.

The value of the next writable LBA in each zone is managed by the write pointer corresponding to each zone. FIG. 5 is a diagram illustrating an update operation of the write pointer executed in the SSD 3.

The controller 4 manages a plurality of write pointers corresponding to a plurality of respective zones. Each write pointer indicates the next writable LBA in the zone corresponding to the write pointer. When data is sequentially written to a certain zone, the controller 4 increases the value of the write pointer corresponding to this zone by the number of logical blocks to which the data is written.

Here, the update operation of the write pointer will be described using the zone #1 as an example. The zone #1 includes a logical block address range from the LBA m to the LBA n−1. The LBA m is the smallest logical block address of the zone #1, that is, the zone start logical block address (ZSLBA) of the zone #1.

When the zone #1 is in an empty state in which valid data is not included, the write pointer corresponding to the zone #1 indicates the LBA m that is the zone start logical block address of the zone #1. When receiving a command for opening the zone #1 from the host 2, the controller 4 changes the state of the zone #1 to an open state in which data can be written. In this case, the controller 4 executes the erase operation on one of the block groups (free block groups) in the empty state not including the valid data, and allocates this one block group as the physical storage region in the open state associated with the zone #1. As a result, writing to the zone #1 is possible.

When the write destination location (start LBA) specified by the write command specifying the zone #1 is equal to the write pointer (here, LBA m) of the zone #1, the controller 4 writes data in the LBA range starting from the specified start LBA, for example, the LBA m and the LBA m+1.

The controller 4 updates the write pointer of the zone #1 so that the value of the write pointer of the zone #1 increases by the number of logical blocks to which data is written. For example, when data is written to the LBA m and the LBA m+1, the controller 4 updates the value of the write pointer to the LBA m+2. The LBA m+2 indicates the smallest LBA among the unwritten LBAs in the zone #1, that is, the next writable LBA in the zone #1.

In a case where re-writing data to a certain LBA range in the zone #1 to which data has already been written, it is necessary to reset the zone #1, return the value of the write pointer to the LBA m, and open the zone #1 again.

When the zone #1 is reset, the controller 4 can treat the block group allocated as the physical storage region for the zone #1 as a free block group not including valid data. Therefore, this block group can be reused for writing data only by performing the erasing operation on this block group.

The description returns to FIG. 1. The controller 4 can function as a flash translation layer (FTL) configured to execute data management and block management of the NAND flash memory 5. The data management executed by the FTL includes (1) management of mapping information indicating a correspondence relationship between each logical address and each physical address of the NAND flash memory 5, (2) a process for concealing a constraint (for example, read/write operation in units of pages and erasing operation in units of blocks) of the NAND flash memory 5, and the like.

In the present embodiment, since the writing in each zone is sequentially executed, the controller 4 may manage only the correspondence relationship between the start LBA of each zone and the block group allocated to each zone using a zone/block group allocation management table 31.

The block management includes management of a defective block (bad block) and the like. The defective block is a block from/to which data cannot be normally read/written.

In the manufacturing process of the NAND flash memory dies #0 to #15, a defective block may occur in each NAND flash memory die. The controller 4 manages a defective block included in each NAND flash memory die (or each plane of each NAND flash memory die) by using a defective block management table 32. Then, the controller 4 constructs a plurality of block groups in consideration of defective blocks included in the NAND flash memory dies #0 to #15. The defective block management table 32 stores defect information indicating a defective block included in each NAND flash memory die (or each plane).

Note that the defective block managed by the defective block management table 32 may include only a defective block (primary defective block) generated in the process of manufacturing the NAND flash memory dies #0 to #15, or may include both a primary defective block and a defective block (grown defective block) generated after the start of use of the SSD 3. Information indicating each defective block occurring in the process of manufacturing the NAND flash memory dies #0 to #15 may be loaded from the NAND flash memory 5 to the defective block management table 32.

In addition to the NAND interface 13 described above, the controller 4 includes a host interface 11, a CPU 12, a DRAM interface 14, a direct memory access controller (DMAC) 15, a static RAM (SRAM) 16, and an error correction code (ECC) encoding/decoding unit 17. The host interface 11, the CPU 12, the NAND interface 13, the DRAM interface 14, the DMAC 15, the SRAM 16, and the ECC encoding/decoding unit 17 are interconnected through a bus 10.

The host interface 11 is a host interface circuit configured to execute communication with the host 2. The host interface 11 is, for example, a PCIe controller. Alternatively, when the SSD 3 has a configuration incorporating a network interface controller, the host interface 11 may be realized as part of the network interface controller.

The host interface 11 can execute communication with the host 2 in accordance with the NVMe standard. The host interface 11 receives (fetches) various commands from the host 2. These commands include a write command, a read command, an open zone command, a closed zone command, a reset zone command, and the like.

The write command is a command (write request) that writes data (write data) to be written to the NAND flash memory 5. The write command includes, for example, a logical address (start LBA) indicating a first sector in which the write data is to be written, a data size of the write data, and a data pointer (buffer address) indicating a position in the write buffer of the host 2 in which the write data is stored. The write buffer of the host 2 is a storage region provided in the memory 102 of the host 2.

For example, the high-order bit portion of the logical address (start LBA) included in the write command is used as an identifier specifying a zone in which the write data associated with the write command is to be written, that is, the ZSLBA of the zone. In addition, the low-order bit portion of the logical address (start LBA) included in the write command is used as the write destination LBA (offset) in the zone to which the write data is to be written.

Therefore, the logical address specified by the write command indicates one zone among the plurality of zones and an offset in this zone to which the write data is to be written. Note that a zone append command specifying only ZSLBA may be used as the write command. In this case, the write destination LBA (offset) in the zone is determined by the controller 4 so that the writing in this zone is sequentially performed.

The data size of the write data may be specified by, for example, the number of sectors (logical blocks). One sector corresponds to the minimum data size of the write data that can be specified by the host 2. That is, the data size of the write data is represented by a number of the sector.

The read command is a command (read request) that reads data from the NAND flash memory 5. The read command includes a logical address (start LBA) indicating a first sector from which data (data to be read) is to be read, a data size of the data to be read, and a data pointer (buffer address) indicating a position in the read buffer of the host 2 to which the data to be read is to be transferred. The read buffer of the host 2 is a storage region provided in the memory 102 of the host 2.

A high-order bit portion of the logical address included in the read command is used as an identifier specifying a zone in which the data to be read is stored. Further, the low-order bit portion of the logical address included in the read command specifies an offset in the zone in which the data to be read is stored.

The open zone command is a command (open request) for casing one of a plurality of zones each in an empty state to transition to an open state available in writing data. That is, the open zone command is used to cause a specific block group that is in an empty state not including valid data to transition to an open state available in writing data.

The open zone command includes a logical address specifying a zone which should be caused to transition to the open state. For example, the high-order bit portion of the logical address specified by the open zone command is used as an identifier specifying a zone which should be caused to transition to the open state.

The closed zone command is a command (close request) for causing one of the zones in the open state to transition to the closed state in which writing is suspended. The closed zone command includes a logical address specifying a zone which should be caused to transition to the closed state. For example, the high-order bit portion of the logical address specified by the closed zone command is used as an identifier specifying the zone which should be caused to transition to the closed state.

The reset zone command is a command (reset request) for resetting a zone in which rewriting is to be executed and causing the zone to transition to an empty state. For example, the reset zone command is used to cause a zone in a full state filled with data to transition to an empty state not including valid data. The valid data means data associated with the logical address. The reset zone command includes a logical address specifying a zone which should be caused to transition to the empty state. For example, a high-order bit portion of a logical address specified by the reset zone command is used as an identifier specifying a zone which should be caused to transition to the empty state. The value of the write pointer corresponding to the zone which transitioned to the empty state by the reset zone command is set to a value indicating the ZSLBA of this zone.

The CPU 12 is a processor configured to control the host interface 11, the NAND interface 13, the DRAM interface 14, the DMAC 15, the SRAM 16, and the ECC encoding/decoding unit 17.

In response to power-on of the SSD 3, the CPU 12 loads a control program (firmware) from the NAND flash memory 5 or a ROM (not illustrated) into the DRAM 6, and executes the firmware to perform various processes. Note that the firmware may be loaded onto the SRAM 16.

The CPU 12 can execute a command process or the like for processing various commands from the host 2. The operation of the CPU 12 is controlled by the above-described firmware. Part or all of the command processing may be executed by dedicated hardware in the controller 4.

The CPU 12 can function as a flash management unit 21. Part or all of the flash management unit 21 may also be realized by dedicated hardware in the controller 4.

The flash management unit 21 constructs a plurality of block groups each including a plurality of non-defective blocks from a plurality of dies or a plurality of planes included in the NAND flash memory 5, and manages the constructed plurality of block groups as a plurality of physical storage regions accessible by the host 2. Here, the non-defective block means a block that is not defective. The number of dies or planes used to construct the individual block groups is equal to or more than two.

In the embodiment, two types of block groups, that is, a first type block group and a second type block group, can be used to construct a plurality of block groups. That is, the plurality of block groups managed by the flash management unit 21 includes at least a first block group configured using the first type block group and a second block group configured using the second type block group.

The first type block group includes a plurality of non-defective blocks obtained by selecting one or more non-defective blocks in an equal number from each of a plurality of dies or each of a plurality of planes included in the NAND flash memory 5.

The second type block group includes, for example, a plurality of non-defective blocks selected from part of a plurality of dies or part of a plurality of planes included in the NAND flash memory 5 where the number of non-defective blocks included in the second type block group is equal to the number of non-defective blocks included in the first type block group. The number of non-defective blocks per die or per plane included in the second type block group is not the same but is different between a die and another die of the part of the plurality of dies or between a plane and another plane of the part of the plurality of planes.

A difference between the maximum number of non-defective blocks per die or per plane included in the second type block group and the minimum number of non-defective blocks per die or per plane included in the second type block group is equal to or more than two. For example, the second type block group includes two or more non-defective blocks selected from a die or plane having the smallest number of defective blocks among the plurality of dies or the plurality of planes, and does not include a non-defective block in a die or plane having the largest number of defective blocks among the plurality of dies or the plurality of planes.

Here, some configuration examples of the first type block group and the second type block group will be described.

In the present embodiment, in order to equalize the capacity of the plurality of physical storage regions accessible by the host 2, that is, the capacity of the plurality of zones, the number of non-defective blocks included in each of the plurality of block groups is set to be equal.

The plurality of block groups may include, for example, a plurality of first type block groups and one or more second type block groups. The number of non-defective blocks included in each of the one or more second type block groups is equal to the number of non-defective blocks included in each of the plurality of first type block groups.

The plurality of first type block groups is configured using, for example, two or more nonvolatile memory dies among the NAND flash memory dies #0 to #15 mounted on the SSD 3.

In this case, the flash management unit 21 constructs a plurality of first type block groups each including a plurality of non-defective blocks obtained by selecting one or more non-defective blocks in an equal number from each of two or more nonvolatile memory dies. For example, when each first type block group includes two blocks, each first type block group includes a total of two non-defective blocks selected one by one from each of two nonvolatile memory dies. In addition, for example, in a case where each first type block group includes four blocks, each first type block group includes a total of four non-defective blocks selected one by one from each of the four nonvolatile memory dies.

Alternatively, each of the plurality of first type block groups may include a set of non-defective blocks selected two by two from each of two or more nonvolatile memory dies among the NAND flash memory dies #0 to #15 mounted on the SSD 3. For example, when each first type block group includes four blocks, each first type block group includes a total of four non-defective blocks selected two by two from each of two nonvolatile memory dies.

In this manner, each of the plurality of first type block groups includes one or more non-defective blocks selected in an equal number from each of two or more nonvolatile memory dies.

Each of the one or more second type block groups is also configured with two or more nonvolatile memory dies used to construct the plurality of first type block groups. The flash management unit 21 constructs one or more second type block groups each including a plurality of non-defective blocks obtained by selecting non-defective blocks in a different number from each of two or more nonvolatile memory dies where the number of the non-defective blocks is different between the two or more nonvolatile memory dies.

In this case, each of the one or more second type block groups includes two or more non-defective blocks selected from the nonvolatile memory die having the smallest number of defective blocks among the two or more nonvolatile memory dies, and does not include a non-defective block in the nonvolatile memory die having the largest number of defective blocks among the two or more nonvolatile memory dies.

For example, when each second type block group includes two blocks, each second type block group includes only two non-defective blocks selected from one nonvolatile memory die having a smaller number of defective blocks of the two nonvolatile memory dies and does not include a non-defective block in the other nonvolatile memory die having a larger number of defective blocks.

When a plurality of block groups is constructed using only the first type block group, in a case where the deviation in the number of defective blocks between the nonvolatile memory dies is large, the number of block groups that can be constructed is limited to the number of non-defective blocks included in the nonvolatile memory die having the largest number of defective blocks at the maximum. For this reason, in a non-volatile memory die having a small number of defective blocks, the number of blocks that are not actually used to construct a block group increases although the non-defective blocks are non-defective blocks. This can be a factor in limiting the number of available zones.

In the present embodiment, not only the first type block group including the plurality of non-defective blocks obtained by selecting blocks in an equal number from each the plurality of nonvolatile memory dies, but also the second type block group having the same capacity as the first type block group and including the plurality of non-defective blocks obtained by selecting the blocks in a different number from each the plurality of nonvolatile memory dies is used for constructing the plurality of block groups.

That is, the plurality of block groups is constructed using the first type block group and the second type block group.

In the construction in the second type block group, more non-defective blocks are selected from the nonvolatile memory die having a small number of defective blocks.

Therefore, it is possible to efficiently use almost all the non-defective blocks for constructing a plurality of block groups while maintaining the capacity of all the block groups at the same capacity. Therefore, even when the deviation in the number of defective blocks between the nonvolatile memory dies is large, almost all the non-defective blocks included in the nonvolatile memory dies can be used for constructing the block group. As a result, the number of available zones can be increased, and the capacities (zone capacities) of these zones can be made the same.

Therefore, the capacity of the SSD 3 can be maximized while reducing the burden on the host 2 regarding the management of each zone.

When the NAND flash memory 5 mounted on the SSD 3 includes a plurality of planes, each of the plurality of first type block groups may be configured using two or more planes among the plurality of planes. Similarly, each of the one or more second type block groups may also be configured using the two or more planes.

In addition, in a case where there is a plurality of nonvolatile memory dies (or planes) having a small number of defective blocks, in the construction of a certain second type block group, the flash management unit 21 selects more non-defective blocks from the first nonvolatile memory die having a small number of defective blocks (or the first plane having a small number of defective blocks). In the construction of another second type block group, the flash management unit 21 selects more non-defective blocks from the second nonvolatile memory die having a small number of defective blocks (or the second plane having a small number of defective blocks). As a result, almost all the non-defective blocks included in each of these nonvolatile memory dies (or planes) having a small number of defective blocks can be used for constructing the block group.

For example, it is assumed that each block group includes three or more non-defective blocks. In addition, it is assumed that the number of defective blocks included in the first nonvolatile memory die is less by two or more than the number of defective blocks included in the second nonvolatile memory die, and the number of defective blocks included in the third nonvolatile memory die is also less by two or more than the number of defective blocks included in the second nonvolatile memory die.

In this case, each of the plurality of first type block groups includes one or more non-defective blocks selected in an equal number from each of the first to third nonvolatile memory dies.

The one or more second type block groups include a block group for which more blocks are selected from the first nonvolatile memory die and a block group for which more blocks are selected from the third nonvolatile memory die.

The block group for which more blocks are selected from the first nonvolatile memory die includes two or more non-defective blocks selected from the first nonvolatile memory die and one or more non-defective blocks selected from the third nonvolatile memory die, and does not include a non-defective block selected from the second nonvolatile memory die.

The block group for which more blocks are selected from the third nonvolatile memory die includes one or more non-defective blocks selected from the first nonvolatile memory die and two or more non-defective blocks selected from the third nonvolatile memory die, and does not include a non-defective block selected from the second nonvolatile memory die.

With this configuration, almost all defective blocks included in the first to third non-volatile memory dies can be used for constructing the block group.

Note that, in a case where a difference between the number of defective blocks included in a die or a plane having the smallest number of defective blocks among the plurality of dies or the plurality of planes used for constructing the plurality of block groups and the number of defective blocks included in a die or a plane having the largest number of defective blocks among the plurality of dies or the plurality of planes is equal to or more than two, the flash management unit 21 constructs the plurality of block groups using the first type block group and the second type block group.

When a difference between the number of defective blocks included in a die or a plane having the smallest number of defective blocks and the number of defective blocks included in a die or a plane having the largest number of defective blocks is equal to or less than one, the flash management unit 21 constructs a plurality of block groups using only the first type block group.

In the following description, each block group is also referred to as a super block.

The NAND interface 13 is a memory control circuit configured to control the NAND flash memory 5 under the control of the CPU 12.

The DRAM interface 14 is a DRAM control circuit configured to control the DRAM 6 under the control of the CPU 12. Part of the storage region of the DRAM 6 may be used as a storage region for storing the zone/block group allocation management table 31 and the defective block management table 32.

The DMAC 15 executes data transfer between the memory 102 of the host 2 and an internal buffer 161 under control of CPU 12. Part of the storage region of the SRAM 16 is used as the internal buffer 161. Note that part of the storage region of the DRAM 6 may be used as the internal buffer 161. In a case where the write data is to be transferred from the write buffer in the memory 102 of the host 2 to the internal buffer 161, the CPU 12 specifies a transfer source address indicating a position in the write buffer of the host 2, a size of the write data to be transferred, and a transfer destination address indicating a position in the internal buffer 161 for the DMAC 15.

When data is to be written to the NAND flash memory 5, the ECC encoding/decoding unit 17 encodes the data (data to be written) (ECC encoding), thereby adding an error correction code (ECC) as a redundant code to the data. When data is read from the NAND flash memory 5, the ECC encoding/decoding unit 17 performs error correction of the data using the ECC added to the read data (ECC decoding).

Next, an example of configuration of each block group allocated to a zone as a physical storage region will be described. FIG. 6 is a diagram illustrating a first example of a configuration of a plurality of block groups managed in the SSD 3 according to the embodiment.

First, an example of a configuration of a block group according to a comparative example will be described with reference to the upper part of FIG. 6. Here, it is assumed that one block group allocated to one zone includes two blocks. As illustrated in the upper part of FIG. 6, each of the NAND flash memory die #0 and the NAND flash memory die #1 includes 10 blocks BLK0 to BLK9. In the NAND flash memory die #0, among the 10 blocks BLK0 to BLK9, the four blocks BLK2 and BLK7 to BLK9 are defective blocks. On the other hand, in the NAND flash memory die #1, there is no defective block, and all of the 10 blocks BLK0 to BLK9 are non-defective blocks.

In the comparative example, a plurality of block groups (a plurality of super blocks SB) is constructed using only the first type block group. Therefore, the number of super blocks SB that can be constructed is limited to the number of non-defective blocks (here, 6) included in the NAND flash memory die #0 at the maximum.

That is, each of the super blocks SB0 to SB5 includes a total of two non-defective blocks selected one by one from each of the two NAND flash memory dies #0 to #1.

For example, the super block SB0 includes a non-defective block BLK0 selected from the NAND flash memory die #0 and a non-defective block BLK0 selected from the NAND flash memory die #1.

The super block SB1 includes a non-defective block BLK1 selected from the NAND flash memory die #0 and a non-defective block BLK1 selected from the NAND flash memory die #1.

The super block SB2 includes a non-defective block BLK3 selected from the NAND flash memory die #0 and a non-defective block BLK3 selected from the NAND flash memory die #1.

The super block SB3 includes a non-defective block BLK4 selected from the NAND flash memory die #0 and a non-defective block BLK4 selected from the NAND flash memory die #1.

The super block SB4 includes a non-defective block BLK5 selected from the NAND flash memory die #0 and a non-defective block BLK5 selected from the NAND flash memory die #1.

The super block SB5 includes a non-defective block BLK6 selected from the NAND flash memory die #0 and a non-defective block BLK6 selected from the NAND flash memory die #1.

When the six super blocks SB0 to SB5 are constructed, the number of remaining non-defective blocks in the NAND flash memory die #0 is zero. Therefore, four non-defective blocks (here, BLK2, BLK7 to BLK9) among the 10 non-defective blocks (BLK0 to BLK9) in the NAND flash memory die #1 are not used for constructing the super block SB. As a result, the capacity corresponding to the four blocks is wasted.

It is also possible to construct four super blocks SB using four non-defective blocks (here, BLK2, BLK7 to BLK9).

However, in this case, the capacity of each of the four super blocks SB is half the capacity of each of the other super blocks SB. As a result, since the capacity of the plurality of zones is irregular, it is difficult for the host 2 to treat the plurality of zones.

Next, an example of a configuration of a block group according to the present embodiment will be described with reference to the lower part of FIG. 6. In the present embodiment, eight block groups (super blocks SB0 to SB7) are constructed using not only the plurality of first type block groups but also one or more second type block groups.

Each of the super blocks SB0 to SB5 is the first type block group. Each of the super blocks SB0 to SB5 includes a total of two non-defective blocks selected one by one from each the two NAND flash memory dies #0 to #1.

For example, the super block SB0 includes a non-defective block BLK0 selected from the NAND flash memory die #0 and a non-defective block BLK0 selected from the NAND flash memory die #1.

The super block SB1 includes a non-defective block BLK1 selected from the NAND flash memory die #0 and a non-defective block BLK1 selected from the NAND flash memory die #1.

The super block SB2 includes a non-defective block BLK3 selected from the NAND flash memory die #0 and a non-defective block BLK2 selected from the NAND flash memory die #1.

The super block SB3 includes a non-defective block BLK4 selected from the NAND flash memory die #0 and a non-defective block BLK3 selected from the NAND flash memory die #1.

The super block SB4 includes a non-defective block BLK5 selected from the NAND flash memory die #0 and a non-defective block BLK4 selected from the NAND flash memory die #1.

The super block SB5 includes a non-defective block BLK6 selected from the NAND flash memory die #0 and a non-defective block BLK5 selected from the NAND flash memory die #1.

Each of the super blocks SB6 to SB7 is the second type block group. Each of the super blocks SB6 to SB7 includes a total of two non-defective blocks selected from the NAND flash memory die #1 having a small number of defective blocks. Each of the super blocks SB6 to SB7 does not include a non-defective block in the NAND flash memory die #0 having a large number of defective blocks.

In each of the super blocks SB0 to SB5, two blocks included in each super block SB belong to different NAND flash memory dies. Therefore, write or read operations on these two blocks can be performed in parallel.

On the other hand, in each of the super blocks SB6 to SB7, the two blocks included in each super block SB belong to the same NAND flash memory die. Therefore, write or read operations on these two blocks cannot be performed in parallel.

Therefore, the time required to write data in the zone to which the super block SB6 or SB7 is allocated is twice the time required to write data in the zone to which any of the super blocks SB0 to SB5 is allocated.

Similarly, the time required to read data from the zone to which the super block SB6 or SB7 is allocated is twice the time required to read data from the zone to which any of the super blocks SB0 to SB5 is allocated.

In this way, the access speed of the second type block group is equal to half the access speed of the first type block group.

However, even when there is a deviation in the number of defective blocks between the NAND flash memory die #0 and the NAND flash memory die #1, by using the second type block group, all (or almost all) of the non-defective blocks included in the NAND flash memory die #1 having a small number of defective blocks can be used for constructing the super block SB.

Hereinafter, the zone to which the first type block group is allocated is referred to as a full speed zone, and the zone to which the second type block group is allocated is referred to as a half speed zone. In addition, the first type block group is referred to as a full speed block group, and the second type block group is referred to as a half-speed block group.

Figure 7:
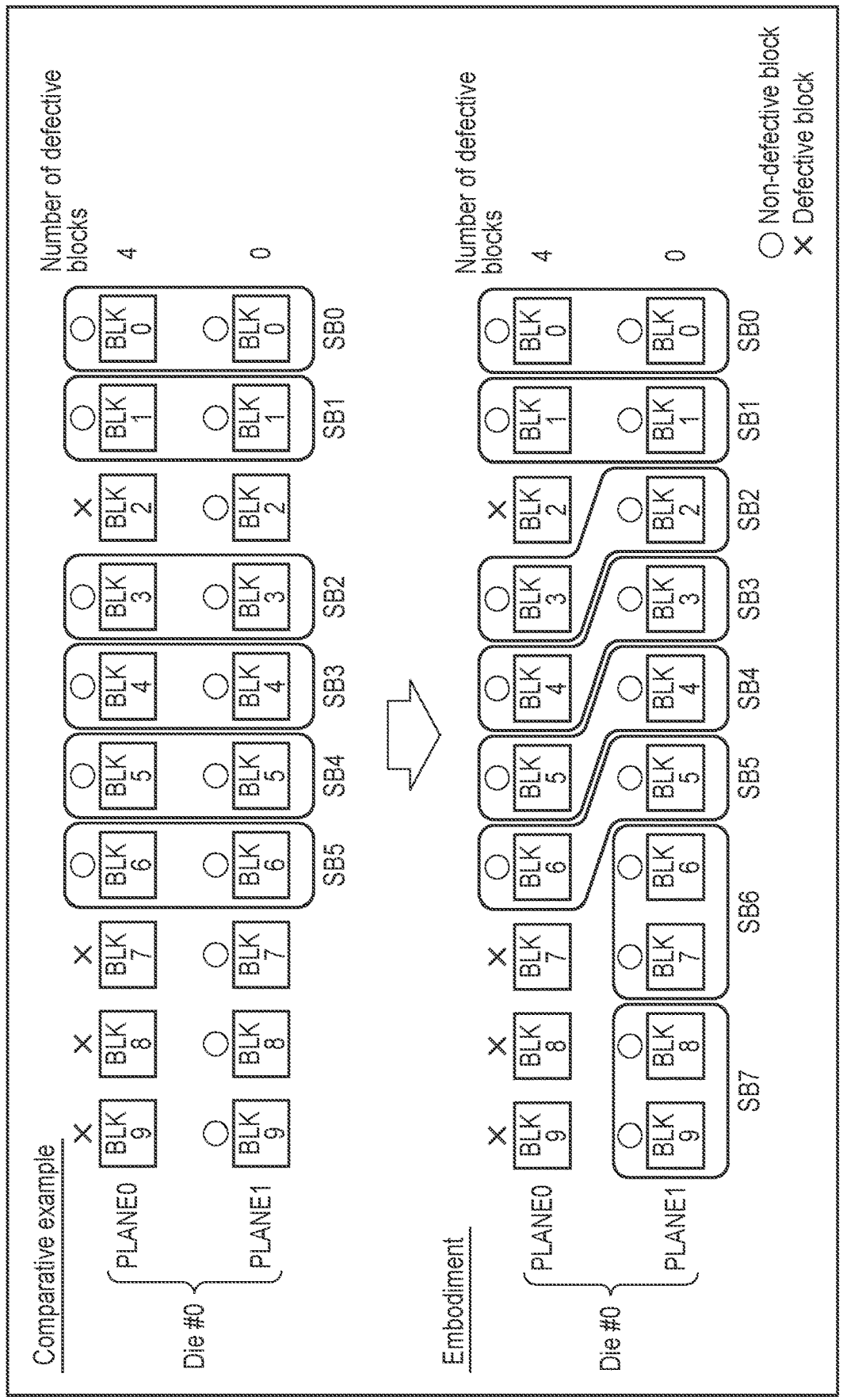
FIG. 7 is a diagram illustrating a second example of a configuration of a plurality of block groups managed in the memory system according to the embodiment.

FIG. 7 is a diagram illustrating a second configuration example of a plurality of block groups managed in the SSD 3 according to the embodiment.

First, a configuration example of a block group according to a comparative example will be described with reference to the upper part of FIG. 7. Here, it is assumed that the NAND flash memory die #0 includes two planes, and one block group allocated to one zone includes two blocks. As illustrated in the upper part of FIG. 7, each of the first plane (PLANE 0) and the second plane (PLANE 1) in the NAND flash memory die #0 includes 10 blocks BLK0 to BLK9. In the first plane (PLANE 0), among the 10 blocks BLK0 to BLK9, the four blocks BLK2 and BLK7 to BLK9 are defective blocks. On the other hand, in the second plane (PLANE 1), there is no defective block, and all of the 10 blocks BLK0 to BLK9 are non-defective blocks.

In the comparative example, a plurality of block groups (a plurality of super blocks SB) is constructed using only the first type block group. Therefore, the number of super blocks SB that can be constructed is limited to the number of non-defective blocks (here, 6) included in the first plane (PLANE 0) at the maximum.

That is, each of the super blocks SB0 to SB5 includes a total of two non-defective blocks selected one by one from each of two planes (PLANE 0 to PLANE 1). For example, the super block SB0 includes a non-defective block BLK0 selected from the first plane (PLANE 0) and a non-defective block BLK0 selected from the second plane (PLANE 1). The super block SB1 includes a non-defective block BLK1 selected from the first plane (PLANE 0) and a non-defective block BLK1 selected from the second plane (PLANE 1). The super block SB2 includes a non-defective block BLK3 selected from the first plane (PLANE 0) and a non-defective block BLK3 selected from the second plane (PLANE 1). The super block SB3 includes a non-defective block BLK4 selected from the first plane (PLANE 0) and a non-defective block BLK4 selected from the second plane (PLANE 1). The super block SB4 includes a non-defective block BLK5 selected from the first plane (PLANE 0) and a non-defective block BLK5 selected from the second plane (PLANE 1). The super block SB5 includes a non-defective block BLK6 selected from the first plane (PLANE 0) and a non-defective block BLK6 selected from the second plane (PLANE 1).

When the six super blocks SB0 to SB5 are constructed, the number of remaining non-defective blocks in the first plane (PLANE 0) is zero. Therefore, four non-defective blocks (here, BLK2, BLK7 to BLK9) among the 10 non-defective blocks (BLK0 to BLK9) in the second plane (PLANE 1) are not used for constructing the super block SB. As a result, the capacity corresponding to the four blocks is wasted.

Next, a configuration example of a block group according to the present embodiment will be described with reference to the lower part of FIG. 7. In the present embodiment, eight block groups (super blocks SB0 to SB7) are constructed using not only the plurality of first type block groups but also one or more second type block groups.

Each of the super blocks SB0 to SB5 is the first type block group. Each of the super blocks SB0 to SB5 includes a total of two non-defective blocks selected one by one from each of the first plane (PLANE 0) and the second plane (PLANE 1).

For example, the super block SB0 includes a non-defective block BLK0 selected from the first plane (PLANE 0) and a non-defective block BLK0 selected from the second plane (PLANE 1). The super block SB1 includes a non-defective block BLK1 selected from the first plane (PLANE 0) and a non-defective block BLK1 selected from the second plane (PLANE 1). The super block SB2 includes a non-defective block BLK3 selected from the first plane (PLANE 0) and a non-defective block BLK2 selected from the second plane (PLANE 1). The super block SB3 includes a non-defective block BLK4 selected from the first plane (PLANE 0) and a non-defective block BLK3 selected from the second plane (PLANE 1). The super block SB4 includes a non-defective block BLK5 selected from the first plane (PLANE 0) and a non-defective block BLK4 selected from the second plane (PLANE 1). The super block SB5 includes a non-defective block BLK6 selected from the first plane (PLANE 0) and a non-defective block BLK5 selected from the second plane (PLANE 1).

Each of the super blocks SB6 to SB7 is the second type block group. Each of the super blocks SB6 to SB7 includes a total of two non-defective blocks selected from the second plane (PLANE 1) having a small number of defective blocks. Each of the super blocks SB6 to SB7 does not include a non-defective block in the first plane (PLANE 0) having a large number of defective blocks.

In each of the super blocks SB0 to SB5, the two blocks included in each super block SB belong to different planes. Therefore, write or read operations on these two blocks can be executed in parallel.

On the other hand, in each of the super blocks SB6 to SB7, the two blocks included in each super block SB belong to the same plane. Therefore, write or read operations on these two blocks cannot be executed in parallel.

As described above, even when the deviation in the number of defective blocks between the first plane (PLANE 0) and the second plane (PLANE 1) is large, by using not only the plurality of first type block groups but also one or more second type block groups, all (or almost all) non-defective blocks included in the second plane (PLANE 1) having a small number of defective blocks can be used for constructing the super block SB.

Figure 8:
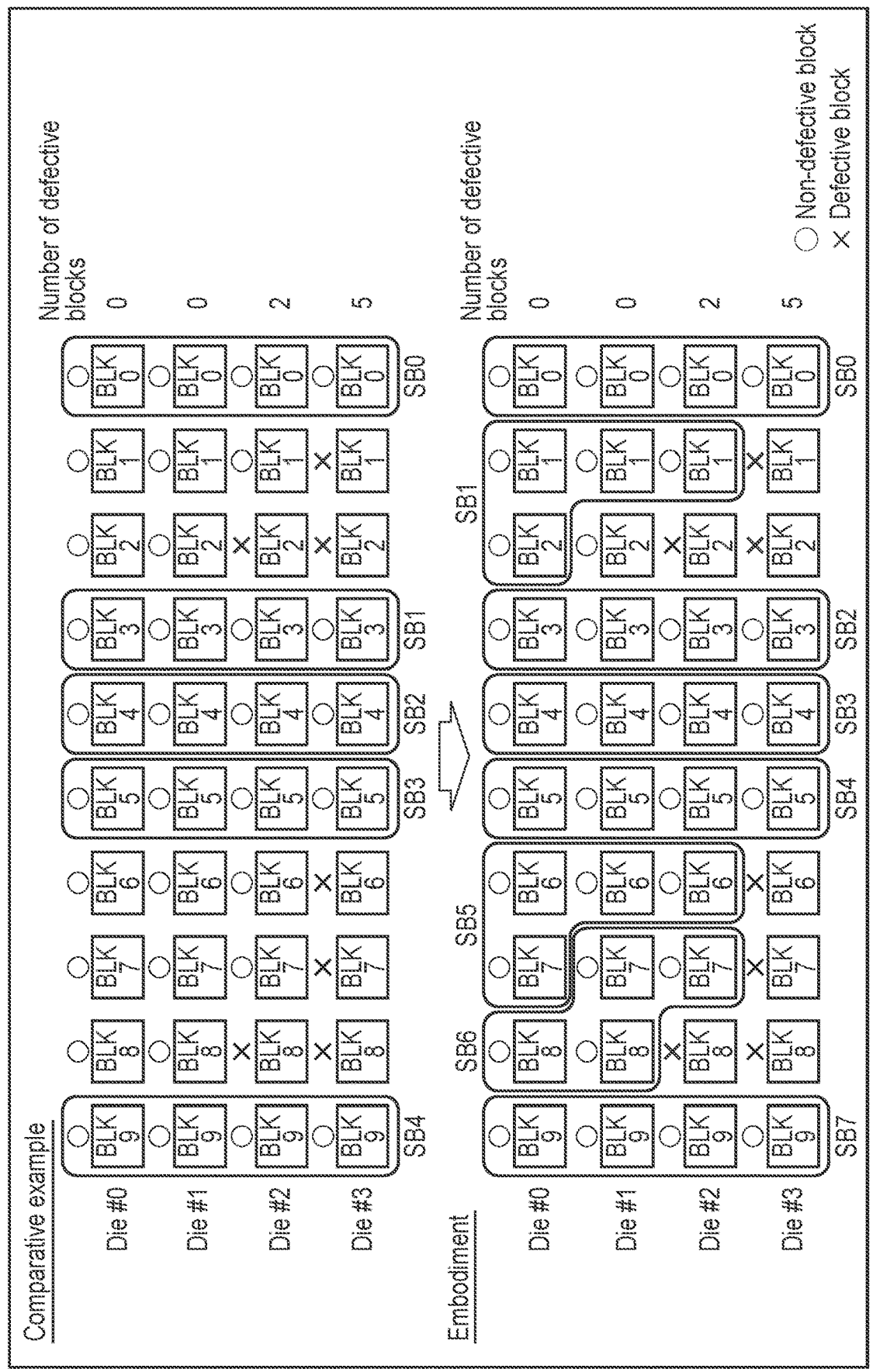
FIG. 8 is a diagram illustrating a third example of a configuration of a plurality of block groups managed in the memory system according to the embodiment.

FIG. 8 is a diagram illustrating a third example of a configuration of a plurality of block groups managed in the SSD 3 according to the embodiment.

First, an example of a configuration of a block group according to a comparative example will be described with reference to the upper part of FIG. 8. Here, it is assumed that one block group allocated to one zone includes four blocks. As illustrated in the upper part of FIG. 8, each of the NAND flash memory dies #0 to #3 includes 10 blocks BLK0 to BLK9. The number of defective blocks included in the NAND flash memory die #0 is zero. The number of defective blocks included in the NAND flash memory die #1 is also zero. The number of defective blocks included in the NAND flash memory die #2 is two. The number of defective blocks included in the NAND flash memory die #3 is five.

In the comparative example, a plurality of block groups (a plurality of super blocks SB) is constructed using only the first type block group. Therefore, the number of super blocks SB that can be constructed is limited to the number of non-defective blocks (here, 5) included in the NAND flash memory die #3 having the largest number of defective blocks at the maximum.

The five non-defective blocks (here, BLK1 to BLK2 and BLK6 to BLK8) among the 10 non-defective blocks (BLK0 to BLK9) in the NAND flash memory die #0 are not used for constructing the super block SB. As a result, the capacity corresponding to the five blocks is wasted.

Also in the NAND flash memory die #1, the five non-defective blocks (here, BLK1 to BLK2 and BLK6 to BLK8) are not used for constructing the super block SB. As a result, the capacity corresponding to the five blocks is wasted.

In the NAND flash memory die #2, the three non-defective blocks (here, BLK1, BLK6 to BLK7) are not used for constructing the super block SB. As a result, the capacity corresponding to the three blocks is wasted.

Next, an example of a configuration of a block group according to the present embodiment will be described with reference to the lower part of FIG. 8. In the present embodiment, eight block groups (super blocks SB0 to SB7) are constructed using not only the plurality of first type block groups but also one or more second type block groups.

Each of the super blocks SB0, SB2 to SB4, and SB7 is the first type block group. Each of the super blocks SB0, SB2 to SB4, and SB7 includes a total of four non-defective blocks selected one by one from each of the four NAND flash memory dies #0 to #3.

Each of the super blocks SB1 and SB5 to SB6 is the second type block group. The super block SB1 includes two non-defective blocks BLK1 to BLK2 selected from the NAND flash memory die #0, one non-defective block BLK1 selected from the NAND flash memory die #1, and one non-defective block BLK1 selected from the NAND flash memory die #2. The super block SB1 does not include a non-defective block in the NAND flash memory die #3.

In the super block SB1, the write or read operation on one of the two non-defective blocks BLK1 to BLK2 in the NAND flash memory die #0 can be executed in parallel with the write or read operation on the two non-defective blocks BLK1 in the two NAND flash memory dies #1 to #2. However, the write or read operation on the other of the two non-defective blocks BLK1 to BLK2 in the NAND flash memory die #0 cannot be executed in parallel. Therefore, the time required to write data in the zone to which the super block SB1 is allocated is twice the time required to write data in the zone to which any of the super blocks SB0, SB2 to SB4, and SB7 is allocated. Therefore, the zone to which the super block SB1 is allocated operates as the half speed zone.

The super block SB5 includes two non-defective blocks BLK6 to BLK7 selected from the NAND flash memory die #0, one non-defective block BLK6 selected from the NAND flash memory die #1, and one non-defective block BLK6 selected from the NAND flash memory die #2. The super block SB5 does not include a non-defective block in the NAND flash memory die #3. The zone to which the super block SB5 is allocated also operates as the half speed zone.

The super block SB6 includes one non-defective block BLK8 selected from the NAND flash memory die #0, two non-defective blocks BLK7 to BLK8 selected from the NAND flash memory die #1, and one non-defective block BLK7 selected from the NAND flash memory die #2. The super block SB6 does not include a non-defective block in the NAND flash memory die #3.

In the super block SB6, the write or read operation on one of the two non-defective blocks BLK7 to BLK8 in the NAND flash memory die #1 can be executed in parallel with the write or read operation on the non-defective block BLK8 in the NAND flash memory die #0 and the non-defective block BLK7 in the NAND flash memory die #2. However, the write or read operation on the other of the two non-defective blocks BLK7 to BLK8 in the NAND flash memory die #1 cannot be executed in parallel. Therefore, the time required to write data in the zone to which the super block SB6 is allocated is twice the time required to write data in the zone to which any of the super blocks SB0, SB2 to SB4, and SB7 is allocated. Therefore, the zone to which the super block SB6 is allocated also operates as the half speed zone.

Figure 9:
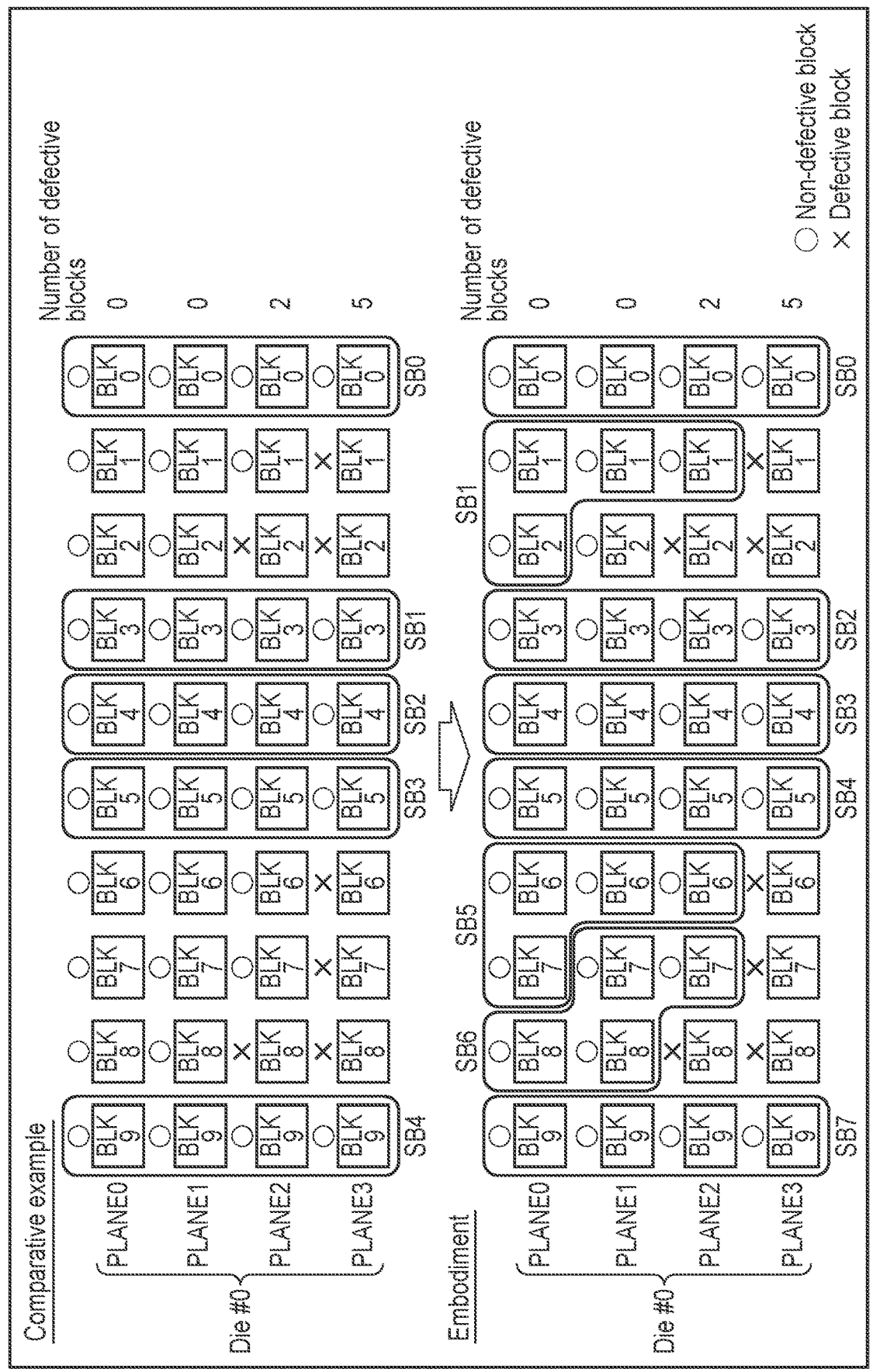
FIG. 9 is a diagram illustrating a fourth example of a configuration of a plurality of block groups managed in the memory system according to the embodiment.

FIG. 9 is a diagram illustrating a fourth example of a configuration of a plurality of block groups managed in the SSD 3 according to the embodiment.

First, an example of a configuration of a block group according to a comparative example will be described with reference to the upper part of FIG. 9. Here, it is assumed that the NAND flash memory die #0 includes four planes, and one block group allocated to one zone includes four blocks. As illustrated in the upper part of FIG. 9, each of the first to fourth planes (PLANE 0 to PLANE 3) includes 10 blocks BLK0 to BLK9. The number of defective blocks included in the first plane (PLANE 0) is zero. The number of defective blocks included in the second plane (PLANE 1) is also zero. The number of defective blocks included in the third plane (PLANE 2) is two. The number of defective blocks included in the fourth plane (PLANE 3) is five.

In the comparative example, a plurality of block groups (a plurality of super blocks SB) is constructed using only the first type block group. Therefore, the number of super blocks SB that can be constructed is limited to the number of non-defective blocks (five in this case) included in the fourth plane (PLANE 3) having the largest number of defective blocks at the maximum.

The five non-defective blocks (here, BLK1 to BLK2 and BLK6 to BLK8) of the 10 non-defective blocks (BLK0 to BLK9) in the first plane (PLANE 0) are not used for constructing the super block SB. As a result, the capacity corresponding to the five blocks is wasted.

Also in the second plane (PLANE 1), the five non-defective blocks (here, BLK1 to BLK2 and BLK6 to BLK8) are not used to construct the super block SB. As a result, the capacity corresponding to the five blocks is wasted.

In the third plane (PLANE 2), the three non-defective blocks (here, BLK1, BLK6 to BLK7) are not used to construct the super block SB. As a result, the capacity corresponding to the three blocks is wasted.

Next, an example of a configuration of a block group according to the present embodiment will be described with reference to the lower part of FIG. 9. In the present embodiment, eight block groups (super blocks SB0 to SB7) are constructed using not only the plurality of first type block groups but also one or more second type block groups.

Each of the super blocks SB0, SB2 to SB4, and SB7 is the first type block group. Each of the super blocks SB0, SB2 to SB4, and SB7 includes a total of four non-defective blocks selected one by one from each of four planes (PLANE 0 to PLANE 3).

Each of the super blocks SB1 and SB5 to SB6 is the second type block group. The super block SB1 includes two non-defective blocks BLK1 to BLK2 selected from the first plane (PLANE 0), one non-defective block BLK1 selected from the second plane (PLANE 1), and one non-defective block BLK1 selected from the third plane (PLANE 2). The super block SB1 does not include a non-defective block in the fourth plane (PLANE 3). The zone to which the super block SB1 is allocated operates as the half speed zone.

The super block SB5 includes two non-defective blocks BLK6 to BLK7 selected from the first plane (PLANE 0), one non-defective block BLK6 selected from the second plane (PLANE 1), and one non-defective block BLK6 selected from the third plane (PLANE 2). The super block SB5 does not include a non-defective block in the fourth plane (PLANE 3). The zone to which the super block SB5 is allocated also operates as the half speed zone.

The super block SB6 includes one non-defective block BLK8 selected from the first plane (PLANE 0), two non-defective blocks BLK7 to BLK8 selected from the second plane (PLANE 1), and one non-defective block BLK7 selected from the third plane (PLANE 2). The super block SB6 does not include a non-defective block in the fourth plane (PLANE 3). The zone to which the super block SB6 is allocated also operates as the half speed zone.

Figure 10:
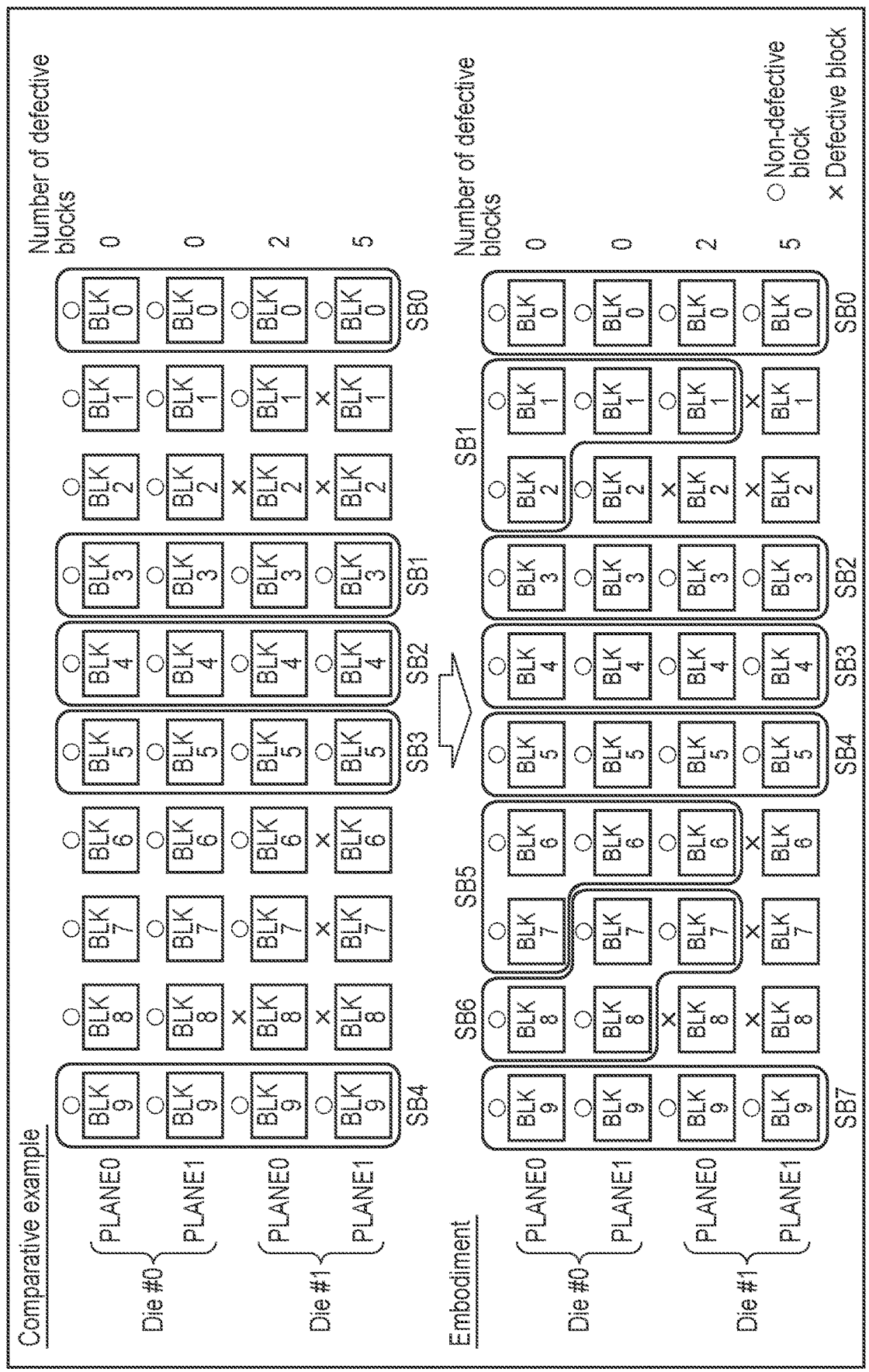
FIG. 10 is a diagram illustrating a fifth example of a configuration of a plurality of block groups managed in the memory system according to the embodiment.

FIG. 10 is a diagram illustrating a fifth example of a configuration of a plurality of block groups managed in the SSD 3 according to the embodiment.

First, an example of a configuration of a block group according to a comparative example will be described with reference to the upper part of FIG. 10. Here, it is assumed that each of the two NAND flash memory dies #0 to #1 includes two planes, and one block group allocated to one zone includes four blocks. As illustrated in the upper part of FIG. 10, each of the first plane (PLANE 0) and the second plane (PLANE 1) in the NAND flash memory die #0 includes 10 blocks BLK0 to BLK9. Each of the first plane (PLANE 0) and the second plane (PLANE 1) in the NAND flash memory die #1 also includes 10 blocks BLK0 to BLK9.

The number of defective blocks included in the first plane (PLANE 0) of the NAND flash memory die #0 is zero. The number of defective blocks included in the second plane (PLANE 1) of the NAND flash memory die #0 is also zero. The number of defective blocks included in the first plane (PLANE 0) of the NAND flash memory die #1 is two. The number of defective blocks included in the second plane (PLANE 1) of the NAND flash memory die #1 is five.

In the comparative example, a plurality of block groups (a plurality of super blocks SB) is constructed using only the first type block group. Therefore, the number of super blocks SB that can be constructed is limited up to the number of non-defective blocks (here, 5) included in the second plane (PLANE 1) of the NAND flash memory die #1 having the largest number of defective blocks at the maximum.

The five non-defective blocks (here, BLK1 to BLK2 and BLK6 to BLK8) among the 10 non-defective blocks (BLK0 to BLK9) in the first plane (PLANE 0) of the NAND flash memory die #0 are not used for constructing the super block SB. As a result, the capacity corresponding to the five blocks is wasted.

Also in the second plane (PLANE 1) of the NAND flash memory die #0, the five non-defective blocks (here, BLK1 to BLK2 and BLK6 to BLK8) are not used for constructing the super block SB. As a result, the capacity corresponding to the five blocks is wasted.

In the first plane (PLANE 0) of the NAND flash memory die #1, the three non-defective blocks (here, BLK1, BLK6 to BLK7) are not used for constructing the super block SB. As a result, the capacity corresponding to the three blocks is wasted.

Next, an example of a configuration of a block group according to the present embodiment will be described with reference to the lower part of FIG. 10. In the present embodiment, eight block groups (super blocks SB0 to SB7) are constructed using not only the plurality of first type block groups but also one or more second type block groups.

Each of the super blocks SB0, SB2 to SB4, and SB7 is the first type block group. Each of the super blocks SB0, SB2 to SB4, and SB7 includes a total of four non-defective blocks selected one by one from each of four planes (a first plane (PLANE 0) and a second plane (PLANE 1) of the NAND flash memory die #0, and a first plane (PLANE 0) and a second plane (PLANE 1) of the NAND flash memory die #1).

Each of the super blocks SB1 and SB5 to SB6 is the second type block group. The super block SB1 includes two non-defective blocks BLK1 to BLK2 selected from the first plane (PLANE 0) of the NAND flash memory die #0, one non-defective block BLK1 selected from the second plane (PLANE 1) of the NAND flash memory die #0, and one non-defective block BLK1 selected from the first plane (PLANE 0) of the NAND flash memory die #1. The super block SB1 does not include a non-defective block in the second plane (PLANE 1) of the NAND flash memory die #1. The zone to which the super block SB1 is allocated operates as the half speed zone.

The super block SB5 includes two non-defective blocks BLK6 to BLK7 selected from the first plane (PLANE 0) of the NAND flash memory die #0, one non-defective block BLK6 selected from the second plane (PLANE 1) of the NAND flash memory die #0, and one non-defective block BLK6 selected from the first plane (PLANE 0) of the NAND flash memory die #1. The super block SB5 does not include a non-defective block in the second plane (PLANE 1) of the NAND flash memory die #1. The zone to which the super block SB5 is allocated also operates as the half speed zone.

The super block SB6 includes one non-defective block BLK8 selected from the first plane (PLANE 0) of the NAND flash memory die #0, two non-defective blocks BLK7 to BLK8 selected from the second plane (PLANE 1) of the NAND flash memory die #0, and one non-defective block BLK7 selected from the first plane (PLANE 0) of the NAND flash memory die #1. The super block SB6 does not include a non-defective block in the second plane (PLANE 1) of the NAND flash memory die #1. The zone to which the super block SB6 is allocated also operates as the half speed zone.

Next, a process of switching whether to use the second type block group according to the difference in the number of defective blocks between the plane having the smallest number of defective blocks and the plane having the largest number of defective blocks will be described.

Figure 11:
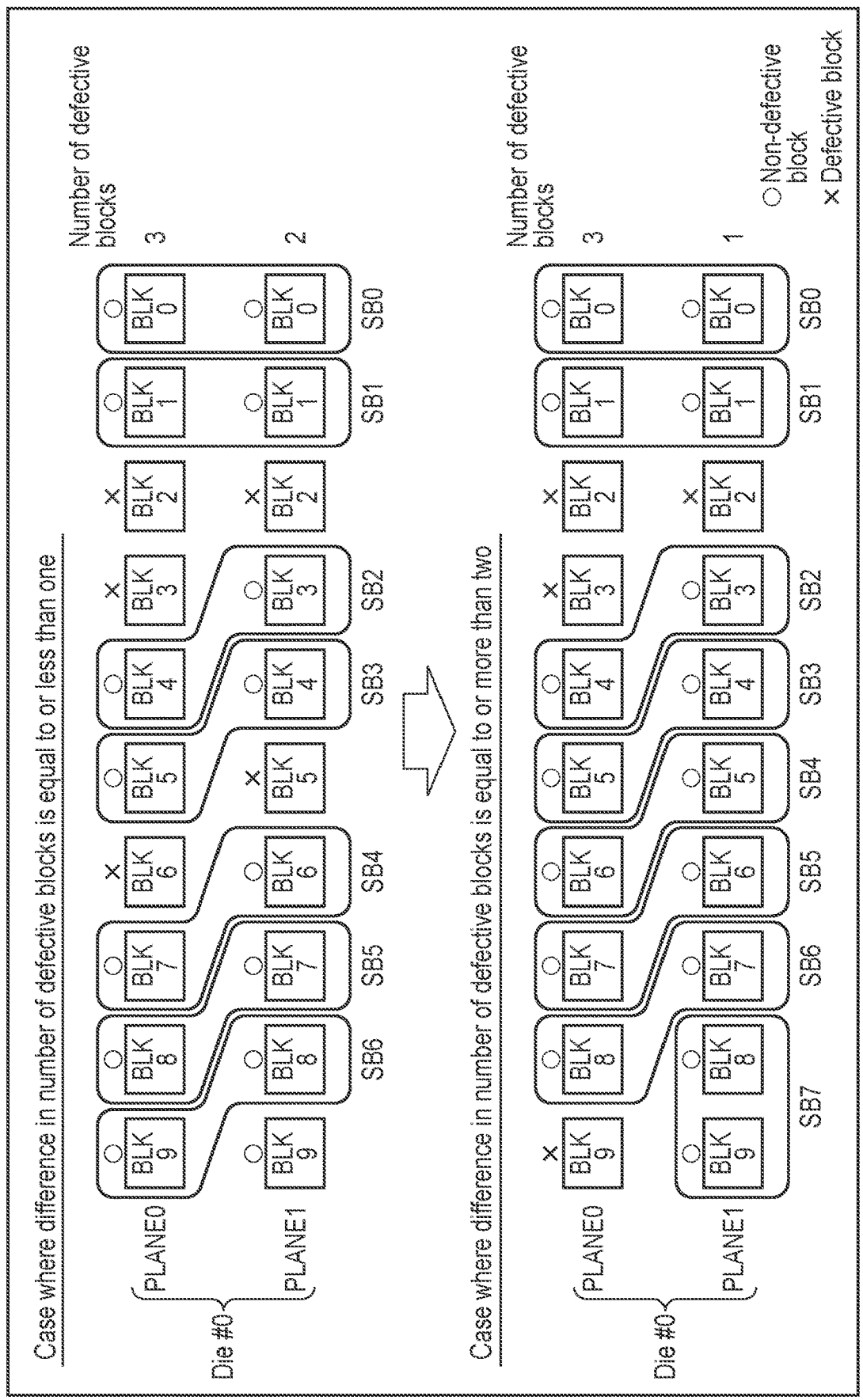
FIG. 11 is a diagram illustrating an example of a plurality of block groups constructed in the memory system according to the embodiment in a case where the difference in the number of defective blocks between the plane having the smallest number of defective blocks and the plane having the largest number of defective blocks is equal to or less than one, and an example of a plurality of block groups constructed in the memory system according to the embodiment in a case where the difference in the number of defective blocks is equal to or more than two.

FIG. 11 is a diagram illustrating an example of a plurality of block groups constructed in the SSD 3 according to the embodiment in a case where the difference in the number of defective blocks between the plane having the smallest number of defective blocks and the plane having the largest number of defective blocks is equal to or less than one, and an example of a plurality of block groups constructed in the SSD 3 according to the embodiment in a case where the difference in the number of defective blocks is equal to or more than two.

In FIG. 11, it is assumed that the NAND flash memory die #0 includes two planes, and one block group allocated to one zone includes two blocks. The upper part of FIG. 11 illustrates a case where the difference in the number of defective blocks is equal to or less than one. The lower part of FIG. 11 illustrates a case where the difference in the number of defective blocks is equal to or more than two.

As illustrated in the upper part of FIG. 11, each of the first plane (PLANE 0) and the second plane (PLANE 1) in the NAND flash memory die #0 includes 10 blocks BLK0 to BLK9. In the first plane (PLANE 0), among the 10 blocks BLK0 to BLK9, the three blocks BLK2 to BLK3 and BLK6 are defective blocks. In the second plane (PLANE 1), among the 10 blocks BLK0 to BLK9, the two blocks BLK2 and BLK5 are defective blocks.

In this case, in the present embodiment, a plurality of block groups (a plurality of super blocks SB) is constructed using only the first type block group. That is, each super block SB includes a total of two non-defective blocks selected one by one from each of the first plane (PLANE 0) and the second plane (PLANE 1). Therefore, the number of second type block groups included in the plurality of block groups is zero.

For example, the super block SB0 includes a non-defective block BLK0 selected from the first plane (PLANE 0) and a non-defective block BLK0 selected from the second plane (PLANE 1). The super block SB1 includes a non-defective block BLK1 selected from the first plane (PLANE 0) and a non-defective block BLK1 selected from the second plane (PLANE 1). The super block SB2 includes a non-defective block BLK4 selected from the first plane (PLANE 0) and a non-defective block BLK3 selected from the second plane (PLANE 1). The super block SB3 includes a non-defective block BLK5 selected from the first plane (PLANE 0) and a non-defective block BLK4 selected from the second plane (PLANE 1). The super block SB4 includes a non-defective block BLK7 selected from the first plane (PLANE 0) and a non-defective block BLK6 selected from the second plane (PLANE 1). The super block SB5 includes a non-defective block BLK8 selected from the first plane (PLANE 0) and a non-defective block BLK7 selected from the second plane (PLANE 1). The super block SB6 includes a non-defective block BLK9 selected from the first plane (PLANE 0) and a non-defective block BLK8 selected from the second plane (PLANE 1).

Only the block BLK9 in the second plane (PLANE 1) is a non-defective block that is not used to construct any super block.

Next, a case where the difference in the number of defective blocks is equal to or more than two will be described. As illustrated in the lower part of FIG. 11, in the first plane (PLANE 0), among the 10 blocks BLK0 to BLK9, the three blocks BLK2 to BLK3 and BLK6 are defective blocks. In the second plane (PLANE 1), the one block BLK2 among the 10 blocks BLK0 to BLK9 is a defective block.

In this case, in the present embodiment, eight block groups (super blocks SB0 to SB7) are constructed using not only the plurality of first type block groups but also one or more second type block groups. The number of second type block groups included in the eight block groups is one or more.

Each of the super blocks SB0 to SB6 is the first type block group. Each of the super blocks SB0 to SB6 includes a total of two non-defective blocks selected one by one from each of the first plane (PLANE 0) and the second plane (PLANE 1).

For example, the super block SB0 includes a non-defective block BLK0 selected from the first plane (PLANE 0) and a non-defective block BLK0 selected from the second plane (PLANE 1). The super block SB1 includes a non-defective block BLK1 selected from the first plane (PLANE 0) and a non-defective block BLK1 selected from the second plane (PLANE 1). The super block SB2 includes a non-defective block BLK4 selected from the first plane (PLANE 0) and a non-defective block BLK3 selected from the second plane (PLANE 1). The super block SB3 includes a non-defective block BLK5 selected from the first plane (PLANE 0) and a non-defective block BLK4 selected from the second plane (PLANE 1). The super block SB4 includes a non-defective block BLK6 selected from the first plane (PLANE 0) and a non-defective block BLK5 selected from the second plane (PLANE 1). The super block SB5 includes a non-defective block BLK7 selected from the first plane (PLANE 0) and a non-defective block BLK6 selected from the second plane (PLANE 1). The super block SB6 includes a non-defective block BLK8 selected from the first plane (PLANE 0) and a non-defective block BLK7 selected from the second plane (PLANE 1).

The super block SB7 is the second type block group. Each of the super block SB7 includes two non-defective blocks BLK8 to BLK9 selected from the second plane (PLANE 1) having a small number of defective blocks. Each of the super block SB7 does not include a non-defective block in the first plane (PLANE 0) having a large number of defective blocks.

Next, a write operation and a read operation executed in the SSD 3 will be described. FIG. 12 is a block diagram illustrating a sequence of the write operation and a sequence of the read operation executed in the SSD 3.

The controller 4 of the SSD 3 is configured to manage mapping between a plurality of block groups (that is, a plurality of super blocks SB) and a plurality of zones, and can allocate any super block SB as a physical storage region of one zone.

One super block SB corresponding to one zone is accessed using consecutive logical addresses included in the LBA range allocated to this zone. Basically, writing in one zone is sequentially executed.

The state of each zone is roughly divided into an open state (opened zone), a closed state (closed zone), a full state (full zone), and an empty state (empty zone).

The zone in the open state is a zone allocated as a write destination zone in which data can be written. When a certain zone is opened, the super block SB corresponding to this zone is allocated as a physical storage region in an open state available in writing data. The flash management unit 21 manages each zone in the open state, that is, the super block SB corresponding to each zone in the open state using an open zone list 111.

The zone in the closed state is a zone in which writing is suspended. The super block SB corresponding to the zone in which writing is suspended is a super block SB which data is written only in part of, that is, a partially written super block SB. In the super block SB corresponding to the zone in the closed state, some pages available in writing data remain. The flash management unit 21 manages each zone in the closed state, that is, the super block SB corresponding to each zone in the closed state, using a closed zone list 112.

The zone in the full state is a zone in which the entire zone is filled with data. The super block SB corresponding to the zone in the full state is a super block SB in which writing to all pages included in this super block SB is completed. The flash management unit 21 manages each zone in the full state, that is, the super block SB corresponding to each zone in the full state using a full zone list 113.

The zone in the empty state is a reset zone. The super block SB corresponding to the zone in the empty state is a free super block SB that does not store valid data. The flash management unit 21 manages each zone in the empty state, that is, the super blocks SB corresponding to each zone in the empty state using an empty zone list 114.

When the host 2 desires to write data to the zone in the empty state, the host 2 transmits, to the SSD 3, an open zone command including a parameter specifying the zone in the empty state, that is, an open zone command specifying the ZSLBA of the zone in the empty state. The open zone command is used as a command for allocating one of the super blocks SB as a physical storage region in an open state available in writing data. In response to receiving the open zone command from the host 2, the flash management unit 21 selects one super block SB from the super blocks SB in the empty state managed by an empty zone list 114. Then, the flash management unit 21 executes an erase operation on the selected super block SB, thereby allocating the selected super block SB as a physical storage region in the open state. As a result, the state of the zone specified by the open zone command transitions from the empty state to the open state.

The host 2 can bring a plurality of zones into an open state by repeatedly executing a process of transmitting an open zone command to the SSD 3.

For example, when a write command including a parameter specifying a zone in an open state, that is, a write command specifying the ZSLBA of a zone in an open state is received from the host 2, the flash management unit 21 uses the DMAC 15 to transfer write data associated with the received write command from a write buffer 51 of the host 2 to the internal buffer 161. Then, the flash management unit 21 writes the write data transferred to the internal buffer 161 to the super block SB allocated to the zone #1. Then, the flash management unit 21 returns a response (write completion) indicating completion of each write command to the host 2.

When writing of data to a certain zone in an open state is not executed for a while, the host 2 transmits, to the SSD 3, a closed zone command for migrating the zone to a closed state in order to release a region in the write buffer 51 of the host 2 secured for this zone.

For example, when a closed zone command including a parameter specifying the zone #1, that is, a closed zone command specifying the ZSLBA of the zone #1 is received from the host 2, the flash management unit 21 migrates the zone #1 to the closed state. In this case, the flash management unit 21 removes the zone #1, that is, the super block SB allocated to the zone #1, from the open zone list 111 and adds the super block SB to the closed zone list 112.

When a write command including a parameter specifying a zone in a closed state is received from the host 2, the flash management unit 21 re-allocates (re-opens) the super block SB allocated to this zone as a physical storage region in an open state.

When a certain entire zone is filled with data, the flash management unit 21 causes the state of this zone to transition from the open state or the closed state to the full state. The super block SB corresponding to this zone is managed as the super block SB in the full state.

When a read command requesting reading of data to be read is received from the host 2, the flash management unit 21 determines a read target zone based on the start LBA included in the read command, and reads the read target data from the super block allocated to the read target zone. Then, the flash management unit 21 transmits the read data as read hit data to the host 2 using the DMAC 15.

When all the data stored in the zone in the full state is unnecessary data that is not used, the host 2 can transmit a reset zone command specifying a logical address indicating this zone to the SSD 3. In response to receiving the reset zone command from the host 2, the flash management unit 21 removes the super block SB allocated to this zone from the full zone list 113 and adds the super block SB to the empty zone list 114. As a result, the state of this zone transitions from the full state to the empty state.

Figure 13:
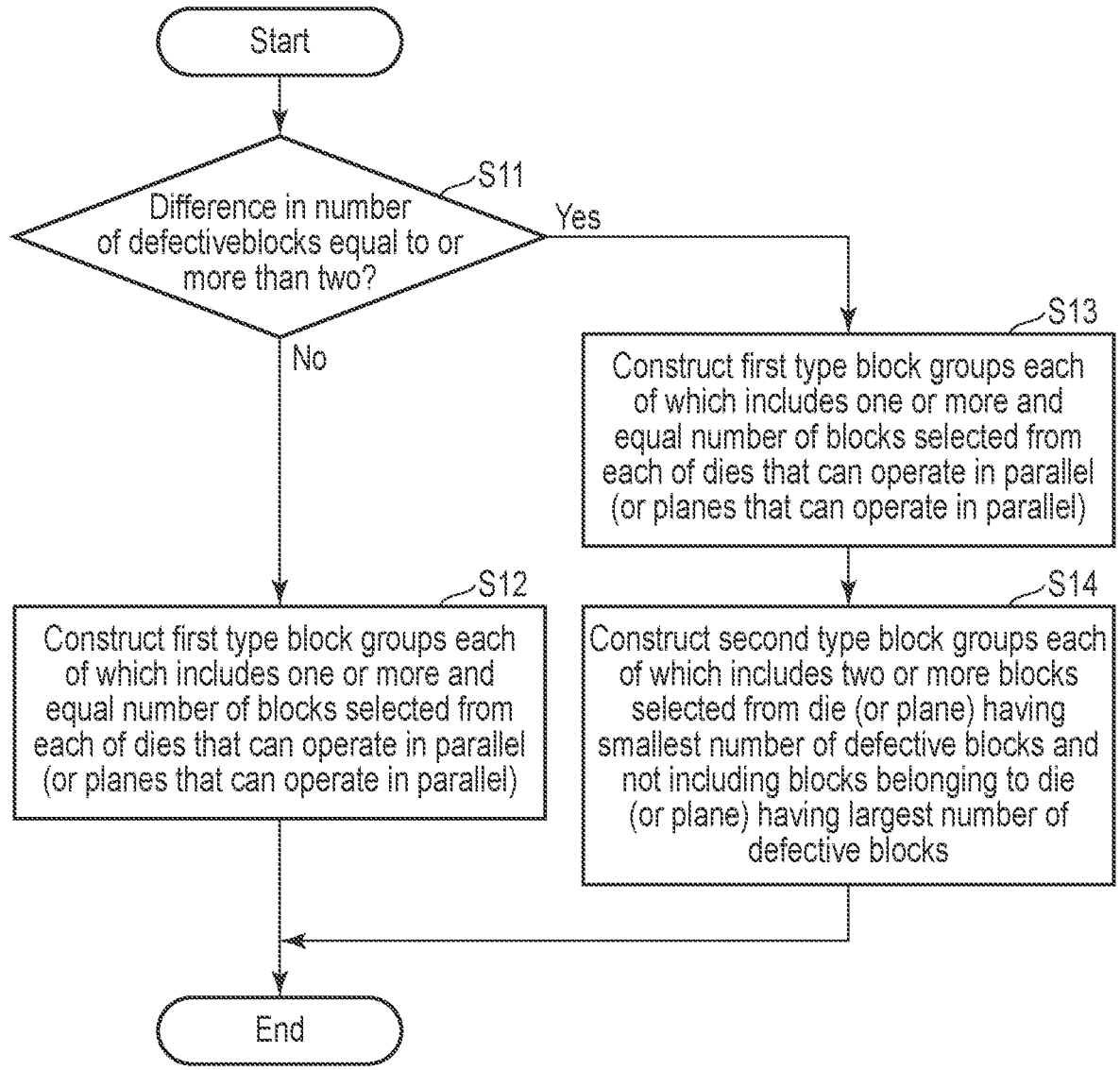
FIG. 13 is a flowchart illustrating a procedure of a block group construction operation executed in the memory system according to the embodiment.

Next, a block group construction operation for constructing the plurality of super blocks SB will be described. FIG. 13 is a flowchart illustrating a procedure of the block group construction operation executed in the SSD 3 according to the embodiment.

The controller 4 determines whether the difference in the number of defective blocks between the plurality of NAND flash memory dies (or the plurality of planes capable of operating in parallel) capable of operating in parallel used for constructing the plurality of super blocks SB is equal to or more than two (step S11). The number of NAND flash memory dies (or planes) used for constructing the super block SB may be equal to or more than two.

In step S11, based on the defect information stored in the defective block management table 32, the controller 4 obtains a difference between the number of defective blocks included in the NAND flash memory die (or plane) having the largest number of defective blocks among the two or more NAND flash memory dies (or two or more planes) used for constructing the plurality of super blocks SB and the number of defective blocks included in the NAND flash memory die (or plane) having the smallest number of defective blocks among the two or more NAND flash memory dies (or two or more planes).

When the difference is equal to or less than one (No in step S11), the controller 4 constructs, as a plurality of super blocks SB, a plurality of first type block groups each including a plurality of non-defective blocks obtained by selecting one or more non-defective blocks in an equal number from each of two or more nonvolatile memory dies (or two or more planes) based on the defect information (step S12). All of the first type block groups constructed in step S12 are used as a full speed block group.

When the difference is equal to or more than two (Yes in step S11), the controller 4 constructs a plurality of first type block groups and one or more second type block groups based on the defect information.

In this case, the controller 4 first constructs, as a plurality of super blocks SB, a plurality of first type block groups each including a plurality of non-defective blocks obtained by selecting one or more non-defective blocks in an equal number from each of two or more nonvolatile memory dies (or two or more planes) (step S13). In step S13, for example, all the non-defective blocks included in the NAND flash memory die (or plane) having the largest number of defective blocks are used for constructing the plurality of first type block groups. All of the first type block groups constructed in step S13 are used as a full speed block group.

When there are no non-defective blocks remaining in the NAND flash memory die (or plane) having the largest number of defective blocks, the controller 4 constructs, as one or more super blocks SB, one or more second type block groups each including a plurality of non-defective blocks obtained by selecting non-defective blocks in a different number from each of two or more nonvolatile memory dies (or two or more planes) (step S14).

In the construction of each second type block group, non-defective block is not selected from the NAND flash memory die (or plane) having the largest number of defective blocks. Two or more non-defective blocks are selected from the NAND flash memory die (or plane) having the smallest number of defective blocks. When each super block is constructed using three or more NAND flash memory dies (or planes), one or more non-defective blocks are selected in an equal number from each of the other NAND flash memory dies (or planes) except for the NAND flash memory die (or plane) having the largest number of defective blocks and the NAND flash memory die (or plane) having the smallest number of defective blocks. All of the second type block groups constructed in step S14 are used as a half-speed block group.

Figure 14:
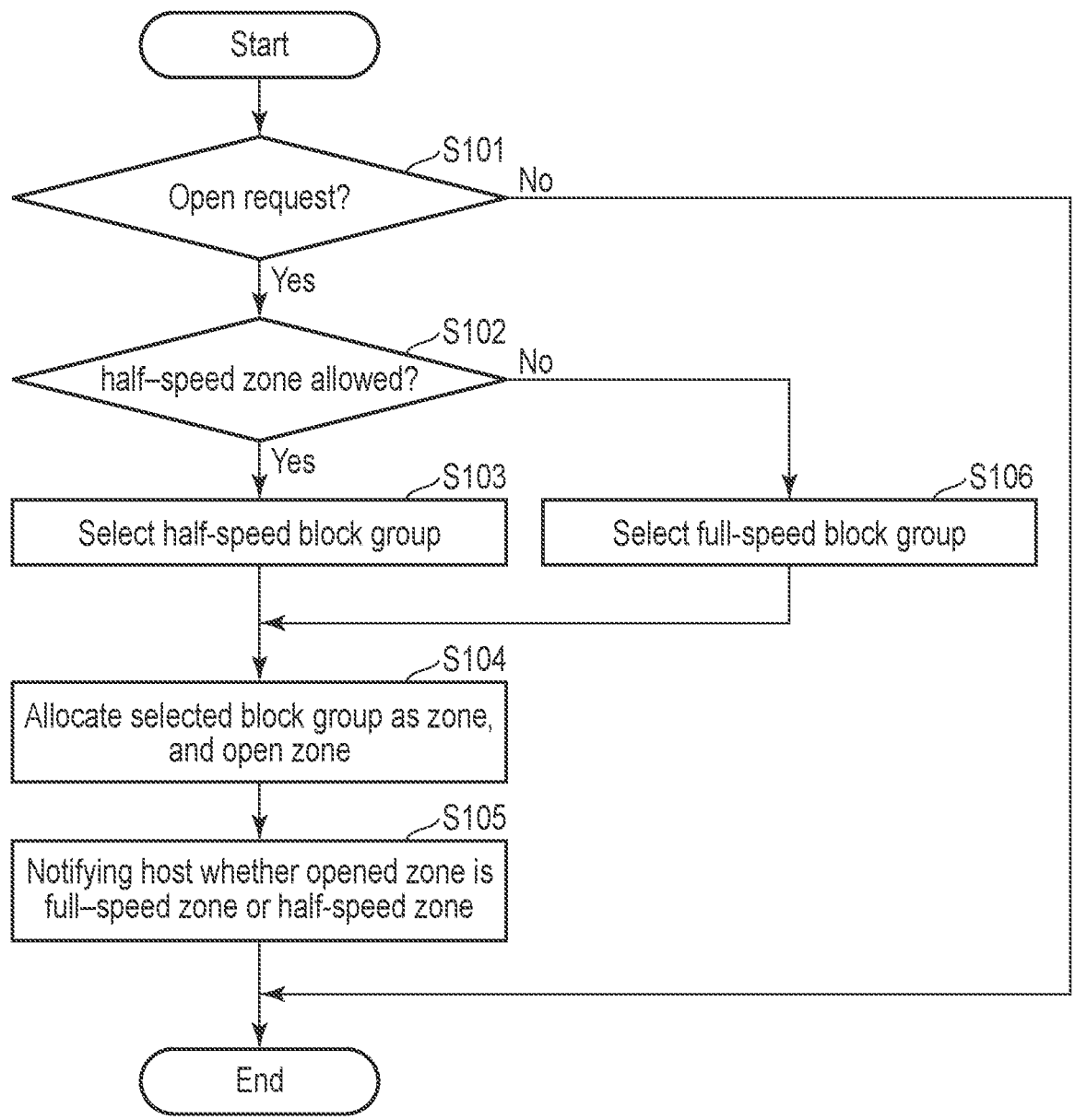
FIG. 14 is a flowchart illustrating a procedure of a block group allocating operation executed in the memory system according to the embodiment.

Next, a process of allocating one of the plurality of block groups as an open physical storage region open state available in writing data will be described. FIG. 14 is a flowchart illustrating a procedure of the block group allocating operation executed in the SSD 3 according to the embodiment.

In the present embodiment, there are two types of block groups; a full speed block group and a half-speed block group. Therefore, in the present embodiment, a command including a first parameter indicating whether allocation of a block group having a second access speed lower than the first access speed is allowed is used as a command for allocating one of a plurality of block groups as a physical storage region in an open state available in writing data.

A command for allocating one of the plurality of block groups as an open state physical storage region available in writing data is realized by, for example, an open zone command (open request). The normal open zone command does not include a parameter indicating whether allocation of a block group having a second access speed lower than the first access speed is allowed. In the present embodiment, a new open zone command (open request) including a parameter indicating whether allocation of a block group having the second access speed is allowed is used.

The first access speed corresponds to an access speed of a full speed zone (full speed block group). The second access speed corresponds to an access speed of a half speed zone (half-speed block group). The parameter included in the open request used in the present embodiment indicates whether allocation of a half speed zone is allowed.

When an open request specifying a certain zone is received from the host 2 (Yes in step S101), the controller 4 determines whether the parameter included in the received open request indicates that allocation of the half speed zone is allowed (step S102).

When the parameter included in the received open request allows allocation of the half speed zone (Yes in step S102), the controller 4 selects the half-speed block group (second type block group) from the block group (free super block SB) in the empty state (step S103).

Next, the controller 4 executes an erase operation on the selected second type block group, and allocates the selected second type block group as a block group in an open state, that is, as a physical storage region of a specified zone (step S104). As a result, the specified zone is opened.

Then, the controller 4 returns a response indicating completion of the open request to the host 2, thereby notifying the host 2 whether the opened zone is the half speed zone or the full speed zone (step S105). That is, the response includes a parameter indicating whether the opened zone is a half speed zone or a full speed zone. In step S104, the second type block group, that is, the half speed zone is opened. In step S105, the host 2 is notified that the opened zone is the half speed zone.

When the parameter included in the received open request does not allow allocation of the half speed zone (No in step S102), the controller 4 selects the full half-speed block group (first type block group) from the block group (free super block SB) in the empty state (step S106).

Next, the controller 4 executes an erase operation on the selected first type block group, and allocates the selected first type block group as a block group in an open state, that is, as a physical storage region of a specified zone (step S104). As a result, the specified zone is opened.

Then, the controller 4 returns a response indicating completion of the open request to the host 2, thereby notifying the host 2 that the opened zone is the full speed zone (step S105).

The host 2 can recognize which zone of the open zones is the full speed zone and which zone of the open zones is the half speed zone. Therefore, the host 2 can control the data placement for each zone so that, for example, data requiring high-speed access is written to the full speed zone and data not requiring high-speed access is written to the half speed zone.

Next, a process of notifying the host 2 of the access speed of each of the plurality of block groups in response to a request from the host 2 will be described. FIG. 15 is a flowchart illustrating a procedure of the access speed notification operation executed in the SSD 3 according to the embodiment. The host 2 can acquire the zone data structure indicating the characteristic of each of the plurality of zones from the SSD 3 by requesting the SSD 3 for the zone data structure indicating the characteristic of each of the plurality of zones managed in the SSD 3.

When the request for acquiring the zone data structure is received from the host 2 (Yes in step S201), the controller 4 notifies the SSD 3 of the access speed information indicating whether each zone is the half speed zone or the full speed zone as the zone data structure together with the zone capacity of each zone, the state of each zone (open/closed/full/empty, etc.), the recommendation notification corresponding to each zone, the write pointer of each zone, the ZSLBA of each zone, and the like (step S202).

In step S202, the host 2 is notified of information indicating the first access speed (full speed zone) with respect to the zone to which the first type block group is allocated. For the zone to which the second type block group is allocated, information indicating the second access speed (half speed zone) is notified to the host 2.

Figure 16:
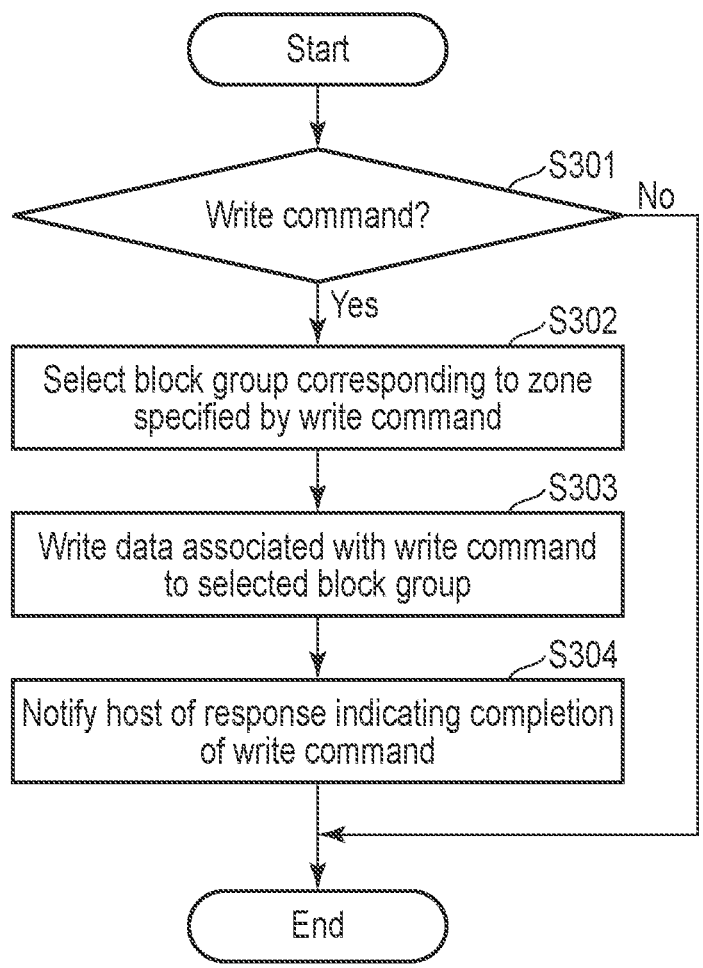
FIG. 16 is a flowchart illustrating a procedure of a data write operation executed in the memory system according to the embodiment.

Next, a process of writing data to one of a plurality of block groups will be described. FIG. 16 is a flowchart illustrating a procedure of the data write operation executed in the SSD 3 according to the embodiment.

When a write command including a parameter specifying a certain zone is received from the host 2 (step S301), the controller 4 selects a block group (super block SB) corresponding to the zone specified by the received write command (step S302). Next, the controller 4 writes the write data associated with the received write command to the selected block group (step S303).

Then, the controller 4 notifies the host 2 of a response indicating completion of the received write command (step S304).

Figure 17:
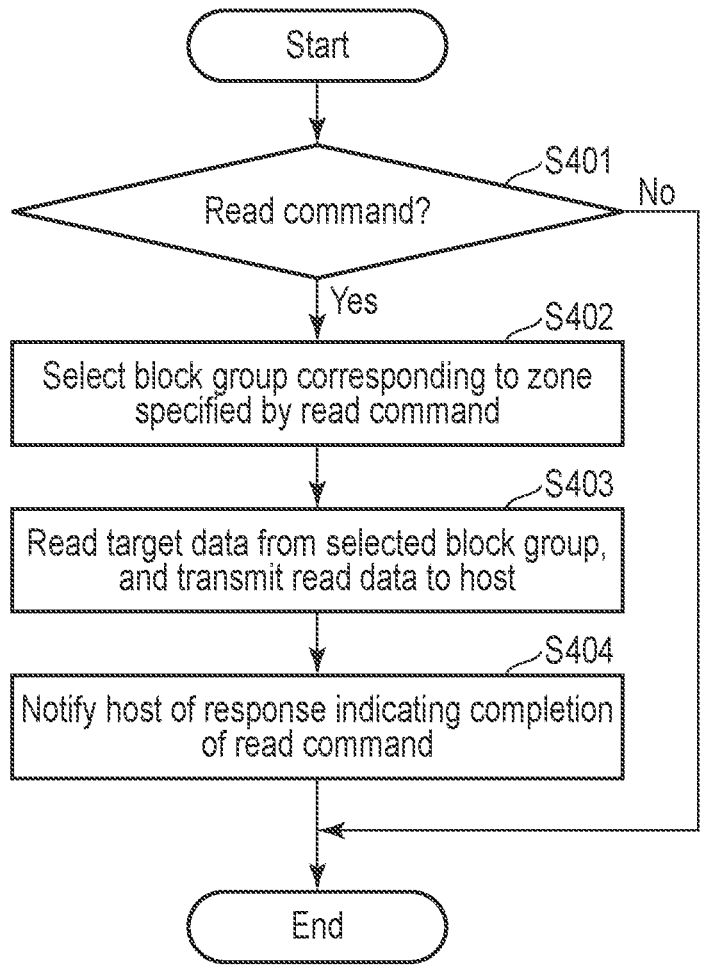
FIG. 17 is a flowchart illustrating a procedure of a data read operation executed in the memory system according to the embodiment.

Next, a process of reading data from one of a plurality of block groups will be described. FIG. 17 is a flowchart illustrating a procedure of the data read operation executed in the SSD 3 according to the embodiment.

When a read command including a parameter specifying a certain zone is received from the host 2 (Yes in step S401), the controller 4 selects a block group (super block SB) corresponding to the zone specified by the read command received in step S401 (step S402).

Next, the controller 4 reads data to be read specified by the received read command from the block group selected in step S402 to transmit the read data to the host 2 (step S403).

Then, the controller 4 notifies the host 2 of a response indicating completion of the received read command (step S404).

As described above, according to the present embodiment, the plurality of block groups includes at least the first block group configured using the first type block group and the second block group configured using the second type block group. The first type block group includes a plurality of non-defective blocks obtained by selecting one or more non-defective blocks in an equal number from each of a plurality of dies or each of a plurality of planes included in the nonvolatile memory 5. The second type block group includes a plurality of non-defective blocks selected from part of the plurality of dies or part of the plurality of planes where the number of non-defective blocks included in the second type block group is equal to the number of non-defective blocks included in the first type block group. The number of non-defective blocks per die or per plane included in the second type block group is different between a first die and a second die of the part of the plurality of dies or between a first plane and a second plane of the part of the plurality of planes.

As described above, the second type block group in which the number of non-defective blocks per die or per plane is different between the first die and the second die of the part of the plurality of dies or between the first plane and the second plane of the part of the plurality of planes, and the number of the plurality of non-defective blocks in the second type block group is equal to the number of the plurality of non-defective blocks included in the first block group is used, so that almost all the non-defective blocks can be used for constructing the block group even when the deviation in the number of defective blocks between the dies or between the planes included in the NAND flash memory 5 is large. As a result, the number of available zones can be increased, and the capacity of these block groups can be made the same. Therefore, it is possible to realize the maximization of the capacity of the SSD 3 while reducing the burden related to the management of each block group (for example, zone) by the host 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a nonvolatile memory including a plurality of dies capable of being operated in parallel or a plurality of planes capable of being operated in parallel, each of the plurality of dies or each of the plurality of planes including a plurality of blocks each of which is a unit for a data erase operation; and
   a controller electrically connected to the nonvolatile memory and configured to control the nonvolatile memory, wherein
   the controller is configured to:
   construct, from the plurality of dies or the plurality of planes, a plurality of block groups each including a plurality of blocks; and
   in response to receiving a write command for writing data to one block group of the plurality of block groups from the host, write data associated with the received write command to the one block group, wherein
   the plurality of block groups includes at least a first block group configured using a first type block group and a second block group configured using a second type block group, wherein
   the first type block group includes a plurality of non-defective blocks obtained by selecting one or more non-defective blocks in an equal number from each of the plurality of dies or each of the plurality of planes, and wherein
   the second type block group includes a plurality of non-defective blocks selected from part of the plurality of dies or part of the plurality of planes, the number of the non-defective blocks included in the second type block group being equal to the number of the non-defective blocks included in the first type block group, and the number of non-defective blocks per die or per plane included in the second type block group is different between a first die and a second die of the part of the plurality of dies or between a first plane and a second plane of the part of the plurality of planes.

2. The memory system according to claim 1, wherein a difference between a maximum number of non-defective blocks per die or per plane included in the second type block group and a minimum number of non-defective blocks per die or per plane included in the second type block group is equal to or more than two.

3. The memory system according to claim 1, wherein the second type block group includes two or more non-defective blocks selected from a die or plane having a smallest number of defective blocks among the plurality of dies or the plurality of planes, and does not include a non-defective block in a die or plane having a largest number of defective blocks among the plurality of dies or the plurality of planes.

4. The memory system according to claim 1, wherein the controller is configured to:
   construct, when a difference between the number of defective blocks included in a die or plane having a smallest number of defective blocks among the plurality of dies or the plurality of planes and the number of defective blocks included in a die or plane having a largest number of defective blocks among the plurality of dies or the plurality of planes is equal to or less than one, the plurality of block groups using the first type block group; and
   construct, when a difference between the number of the defective blocks included in the die or plane having the smallest number of defective blocks and the number of the defective blocks included in the die or plane having the largest number of defective blocks is equal to or more than two, the plurality of block groups using the first type block group and the second type group.

5. The memory system according to claim 1, wherein the controller is configured to:
   allocate one of the plurality of block groups as a physical storage region to each of a plurality of zones to which a plurality of logical address ranges obtained by dividing a logical address space for accessing the memory system are allocated; and
   in response to receiving a first write command including a parameter specifying a first zone among the plurality of zones from the host, write data associated with the first write command to a block group allocated to the first zone.

6. The memory system according to claim 1, wherein the controller is configured to:
   receive, from the host, a first command for allocating one of the plurality of block groups as a physical storage region in an open state available in writing data, the first command including a first parameter indicating whether allocation of a block group having a second access speed lower than a first access speed is allowed;
   when the first parameter of the received first command indicates that allocation of a block group having the second access speed is allowed, allocate one block group configured by the second type block group as the physical storage region in the open state; and
   when the first parameter of the first command does not indicate that allocation of a block group having the second access speed is allowed, allocate one block group configured by the first type block group as the physical storage region in the open state.

7. The memory system according to claim 1, wherein the controller is configured to notify the host of an access speed of each of the plurality of block groups in response to a request from the host, wherein
   with respect to each block group configured by the first type block group among the plurality of block groups, information indicating a first access speed is notified to the host, and wherein
   with respect to each block group configured by the second type block group among the plurality of block groups, information indicating a second is notified to the host.

8. A memory system connectable to a host, the memory system comprising:
- a nonvolatile memory including a plurality of dies capable of being operated in parallel or a plurality of planes capable of being operated in parallel, each of the plurality of dies or the plurality of planes including a plurality of blocks each of which is a unit for a data erase operation; and
- a controller electrically connected to the nonvolatile memory and configured to control the nonvolatile memory, wherein the controller is configured to:

construct, from the plurality of dies or the plurality of planes, a plurality of block groups each including a plurality of blocks using a first type block group when a difference between the number of defective blocks included in a die or plane having a smallest number of defective blocks among the plurality of dies or the plurality of planes and the number of defective blocks included in a die or plane having a largest number of defective blocks among the plurality of dies or the plurality of planes is equal to or less than one;

construct the plurality of block groups from the plurality of dies or the plurality of planes using the first type block group and a second type block group different from the first type block group when a difference between the number of the defective blocks included in the die or plane having the smallest number of defective blocks and the number of the defective blocks included in the die or plane having the largest number of defective blocks is equal to or more than two; and in response to receiving a write command for writing data to one block group among the plurality of block groups from the host, write data associated with the received write command to the one block group, wherein the first type block group includes a plurality of non-defective blocks obtained by selecting one or more non-defective blocks in an equal number from each of the plurality of dies or each of the plurality of planes, and wherein the second type block group includes a plurality of non-defective blocks selected from part of the plurality of dies or part of the plurality of planes, the number of the non-defective blocks included in the second type block group being equal to the number of the non-defective blocks included in the first type block group, and the number of non-defective blocks per die or per plane included in the second type block group is different between a first die and a second die of the part of the plurality of dies or between a first plane and a second plane of the part of the plurality of planes.

9. The memory system according to claim 8, wherein
a difference between a maximum number of non-defective blocks per die or per plane included in the second type block group and a minimum number of non-defective blocks per die or per plane included in the second type block group is equal to or more than two.

10. The memory system according to claim 8, wherein
the second type block group includes two or more non-defective blocks selected from a die or plane having a smallest number of defective blocks among the plurality of dies or the plurality of planes, and does not include a non-defective block in a die or plane having a largest number of defective blocks among the plurality of dies or the plurality of planes.

11. A method of controlling a nonvolatile memory including a plurality of dies operable in parallel or a plurality of planes operable in parallel, each of the plurality of dies or the plurality of planes including a plurality of blocks each of which is a unit for a data erase operation, the method comprising:

constructing, from the plurality of dies or the plurality of planes, a plurality of block groups each including a plurality of blocks; and in response to receiving a write command for writing data to one block group among the plurality of block groups from a host, writing data associated with the received write command to the one block group, wherein the plurality of block groups includes at least a first block group configured using a first type block group and a second block group configured using a second type block group, wherein the first type block group includes a plurality of non-defective blocks obtained by selecting one or more non-defective blocks in an equal number from each of the plurality of dies or each of the plurality of planes, and wherein the second type block group includes a plurality of non-defective blocks selected from part of the plurality of dies or part of the plurality of planes, the number of the non-defective blocks included in the second type block group being equal to the number of the non-defective blocks included in the first type block group, and the number of non-defective blocks per die or per plane included in the second type block group is different between a first die and a second die of the part of the plurality of dies or between a first plane and a second plane of the part of the plurality of planes.

12. The method according to claim 11, wherein
a difference between a maximum number of non-defective blocks per die or per plane included in the second type block group and a minimum number of non-defective blocks per die or per plane included in the second type block group is equal to or more than two.

13. The method according to claim 11, wherein
the number of the plurality of dies or the plurality of planes is equal to or more than two, and wherein
the second type block group includes two or more non-defective blocks selected from a die or plane having a smallest number of defective blocks among the plurality of dies or the plurality of planes, and does not include a non-defective block in a die or plane having a largest number of defective blocks among the plurality of dies or the plurality of planes.

14. The method according to claim 11, wherein
when a difference between the number of defective blocks included in a die or plane having a smallest number of defective blocks among the plurality of dies or the plurality of planes and the number of defective blocks included in a die or plane having a largest number of defective blocks among the plurality of dies or the plurality of planes is equal to or less than one, the plurality of block groups is constructed using the first type block group, and wherein
when a difference between the number of the defective blocks included in the die or plane having the smallest number of defective blocks and the number of the defective blocks included in the die or plane having the largest number of defective blocks is equal to or more than two, the plurality of block groups is constructed using the first type block group and the second type block group.

* * * * *